US011820376B2

United States Patent
Kohno et al.

(10) Patent No.: US 11,820,376 B2
(45) Date of Patent: Nov. 21, 2023

(54) CONTROL DEVICE FOR VEHICLE

(71) Applicant: TOYOTA JIDOSHA KABUSHIKI KAISHA, Toyota (JP)

(72) Inventors: Takashi Kohno, Tokai (JP); Yasuhiro Hiasa, Miyoshi (JP); Yasutaka Tsuchida, Toyota (JP); Tooru Matsubara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 17/493,406

(22) Filed: Oct. 4, 2021

(65) Prior Publication Data
US 2022/0111845 A1    Apr. 14, 2022

(30) Foreign Application Priority Data
Oct. 9, 2020   (JP) .................. 2020-171556

(51) Int. Cl.
*B60W 30/18* (2012.01)
*B60W 40/09* (2012.01)
(Continued)

(52) U.S. Cl.
CPC ...... *B60W 30/18127* (2013.01); *B60W 40/09* (2013.01); *B60W 50/10* (2013.01);
(Continued)

(58) Field of Classification Search
CPC ........ B60L 3/0061; B60L 50/16; B60L 50/61; B60L 7/10; B60L 7/14; B60W 10/02;
(Continued)

(56) References Cited

U.S. PATENT DOCUMENTS 5,923,093 A  *  7/1999  Tabata ................. B60L 3/0061
                                                        903/910
2007/0205735 A1*  9/2007  Kiuchi .................. B60K 6/365
                                                        318/432
(Continued)

FOREIGN PATENT DOCUMENTS

JP    H10-073161 A    3/1998
JP    2000-043696 A   2/2000
(Continued)

*Primary Examiner* — Peter D Nolan
*Assistant Examiner* — Ce Li Li
(74) *Attorney, Agent, or Firm* — Oliff PLC

(57) ABSTRACT

A control device for a vehicle includes an electronic control unit configured to: execute driving assistance control for driving the vehicle at least by automatically controlling a speed irrespective of a driving operation of a driver; execute regenerative braking using a rotator at a time of deceleration during travel under the driving assistance control, and to restrict downshift of an automatic transmission when a demanded deceleration amount for the vehicle is equal to or lower than a predetermined deceleration amount; and execute the regenerative braking using the rotator at the time of deceleration during the travel under the driving assistance control, and not to restrict the downshift when the demanded deceleration amount is higher than the predetermined deceleration amount.

6 Claims, 7 Drawing Sheets

(51) Int. Cl.
*B60W 50/10* (2012.01)
*G06K 9/00* (2022.01)
*G06V 20/59* (2022.01)
*G06V 40/16* (2022.01)

(52) U.S. Cl.
CPC .......... *G06V 20/597* (2022.01); *G06V 40/176* (2022.01); *B60W 2540/30* (2013.01)

(58) Field of Classification Search
CPC ...... B60W 10/06; B60W 10/08; B60W 10/10; B60W 10/26; B60W 20/00; B60W 20/13; B60W 30/143; B60W 40/09; B60W 50/10; B60W 50/14; B60W 2540/10; B60W 2540/12; B60W 2540/18; B60W 2540/30; B60W 2720/106; F16H 61/16; F16H 61/21; G06V 20/597; G06V 40/15; G06V 40/193; Y02T 10/62; Y02T 10/70; Y02T 10/7072

See application file for complete search history.

(56) References Cited

U.S. PATENT DOCUMENTS

| | | | | |
|---|---|---|---|---|
| 2010/0151988 | A1* | 6/2010 | Tabata | B60K 6/445 |
| | | | | 318/434 |
| 2014/0330466 | A1* | 11/2014 | Bureau | F02D 13/04 |
| | | | | 903/903 |
| 2017/0232959 | A1* | 8/2017 | Bureau | B60W 10/02 |
| | | | | 180/65.28 |
| 2018/0009958 | A1 | 4/2018 | Kumazaki et al. | |
| 2018/0099580 | A1 | 4/2018 | Kumazaki et al. | |

FOREIGN PATENT DOCUMENTS

| | | |
|---|---|---|
| JP | 2007-001452 A | 1/2007 |
| JP | 2015-505761 A | 2/2015 |
| JP | 2018-062247 A | 4/2018 |
| WO | 2013/076217 A2 | 5/2013 |

* cited by examiner

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROL DEVICE FOR VEHICLE

CROSS-REFERENCE TO RELATED APPLICATION

This application claims priority to Japanese Patent Application No. 2020-171556 filed on Oct. 9, 2020, incorporated herein by reference in its entirety.

BACKGROUND

1. Technical Field

The present disclosure relates to a control device for a vehicle including an engine, an automatic transmission, and a rotator.

2. Description of Related Art

A control device for a vehicle including an engine, an automatic transmission, and a rotator is known widely. The automatic transmission constitutes a part of a power transmission path between the engine and driving wheels. The rotator is coupled to the driving wheels to transmit driving power. For example, this control device corresponds to a vehicle control device described in Japanese Unexamined Patent Application Publication No. 2018-62247 (JP 2018-62247 A). JP 2018-62247 A discloses that the automatic transmission is downshifted by regenerative braking executed by the rotator as necessary when a demand is made to decelerate the vehicle.

SUMMARY

During decelerating travel of the vehicle, the vehicle can be decelerated also through engine braking applied by friction of the engine. When applying the engine braking during the decelerating travel, a deceleration amount can be increased by downshifting the automatic transmission. Therefore, a demanded deceleration amount for the vehicle is achieved easily. However, NV may increase due to an increase in an engine speed by the downshift. The NV is a generic term for noise and vibration caused in the vehicle. During travel under driving assistance control for driving the vehicle irrespective of a driving operation of a driver, the driver may perceive the NV more easily than travel under manual driving control based on the driving operation of the driver. Therefore, drivability may decrease due to an increase in the NV. When the demanded deceleration amount increases and decreases, busy shifting, that is, repetition of downshift and upshift may occur. During the travel under the driving assistance control, the driver may perceive an engine speed change or a gear shifting shock more easily than the travel under the manual driving control. Therefore, the drivability may decrease due to the busy shifting.

The present disclosure has been made under the circumstances described above, and has an object to provide a control device for a vehicle in which a decrease in drivability can be suppressed while achieving a demanded deceleration amount at the time of deceleration during travel under driving assistance control.

An aspect of the present disclosure relates to a control device for a vehicle including an engine, an automatic transmission constituting a part of a power transmission path between the engine and a driving wheel, and a rotator coupled to the driving wheel to transmit driving power. The control device includes an electronic control unit configured to: execute driving assistance control for driving the vehicle at least by automatically controlling a speed irrespective of a driving operation of a driver; execute regenerative braking using the rotator at a time of deceleration during travel under the driving assistance control, and to restrict downshift of the automatic transmission when a demanded deceleration amount for the vehicle is equal to or lower than a predetermined deceleration amount; and execute the regenerative braking using the rotator at the time of deceleration during the travel under the driving assistance control, and not to restrict the downshift when the demanded deceleration amount is higher than the predetermined deceleration amount.

According to the aspect described above, the regenerative braking is executed at the time of deceleration during the travel under the driving assistance control. When the demanded deceleration amount is equal to or lower than the predetermined deceleration amount, the downshift of the automatic transmission is restricted. When the demanded deceleration amount is higher than the predetermined deceleration amount, the downshift is not restricted. In this manner, the deceleration amount of the vehicle is controlled. During gentle decelerating travel, an increase in the NV along with an increase in the engine speed is suppressed, and the busy shifting is suppressed. During steep decelerating travel, a great deceleration amount is easily obtained through the downshift. Thus, the decrease in the drivability can be suppressed while achieving the demanded deceleration amount at the time of deceleration during the travel under the driving assistance control.

In the above aspect, the predetermined deceleration amount may be a predetermined maximum value of a deceleration amount achievable by the regenerative braking.

According to the aspect described above, the predetermined deceleration amount is the maximum value of the deceleration amount achievable by the regenerative braking. During the gentle decelerating travel, the demanded deceleration amount can be achieved by the regenerative braking though the downshift is restricted.

In the above aspect, the electronic control unit may be configured to restrict the downshift by prohibiting the downshift.

According to the aspect described above, the downshift is restricted by prohibiting the downshift. During the gentle decelerating travel, the increase in the NV along with the increase in the engine speed is suppressed securely, and the busy shifting is suppressed securely.

In the above aspect, the electronic control unit may be configured to: generate a deceleration amount through the regenerative braking without applying engine braking using friction of the engine when the demanded deceleration amount is equal to or lower than the predetermined deceleration amount; and generate the deceleration amount through the engine braking and the regenerative braking when the demanded deceleration amount is higher than the predetermined deceleration amount.

According to the aspect described above, when the demanded deceleration amount is equal to or lower than the predetermined deceleration amount, the deceleration amount is generated through the regenerative braking without applying the engine braking. During the gentle decelerating travel, the demanded deceleration amount can be achieved though the downshift is prohibited. When the demanded deceleration amount is higher than the predetermined deceleration amount, the deceleration amount is generated through the engine braking and the regenerative braking. During the steep decelerating travel, the demanded deceleration amount can be achieved by increasing the friction of the engine through the downshift.

In the above aspect, the electronic control unit may be configured to execute switching about whether to restrict the downshift based on the demanded deceleration amount when a second demanded deceleration amount for the vehicle along with an operation of the driver is not included in the demanded deceleration amount during the travel under the driving assistance control.

According to the aspect described above, when the demanded deceleration amount along with the operation of the driver is not included in the demanded deceleration amount during the travel under the driving assistance control, the switching is executed about whether to restrict the downshift based on the demanded deceleration amount. Thus, the increase in the NV and the busy shifting are easily suppressed when a driver's brake operation or any other operation for reducing a vehicle speed is not carried out during the decelerating travel.

In the above aspect, the demanded deceleration amount may be a deceleration amount to be achieved by the regenerative braking and the engine braking using friction of the engine. The electronic control unit may be configured to set the demanded deceleration amount to be equal to or lower than the predetermined deceleration amount when the deceleration amount is increased by a wheel brake in a state in which the demanded deceleration amount is higher than the predetermined deceleration amount at the time of deceleration during the travel under the driving assistance control.

According to the aspect described above, when the deceleration amount is increased by the wheel brake in the state in which the demanded deceleration amount to be achieved by the regenerative braking and the engine braking is higher than the predetermined deceleration amount at the time of deceleration during the travel under the driving assistance control, the demanded deceleration amount is set equal to or lower than the predetermined deceleration amount. Thus, the downshift of the automatic transmission is suppressed, and a great deceleration amount is generated by the wheel brake with good response.

In the above aspect, the electronic control unit may be configured to drive the vehicle at least by automatically controlling a vehicle speed based on information on a periphery of the vehicle.

According to the aspect described above, the driving assistance control is driving control for driving the vehicle at least by automatically controlling the vehicle speed based on the information on the periphery of the vehicle. Thus, the demanded deceleration amount is appropriately achieved and the vehicle speed is appropriately controlled at the time of deceleration during the travel under the driving assistance control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In embodiments of the present disclosure, a gear ratio of an automatic transmission is "rotation speed of input-side rotational member/rotation speed of output-side rotational member". A high side in the gear ratio is a high vehicle speed side on which the gear ratio is low. A low side in the gear ratio is a low vehicle speed side on which the gear ratio is high. For example, a gear ratio on a lowest side is a gear ratio on a lowest vehicle speed side and is a maximum gear ratio.

The embodiments of the present disclosure are described below in detail with reference to the drawings.

First Embodiment

Figures 1, 2:
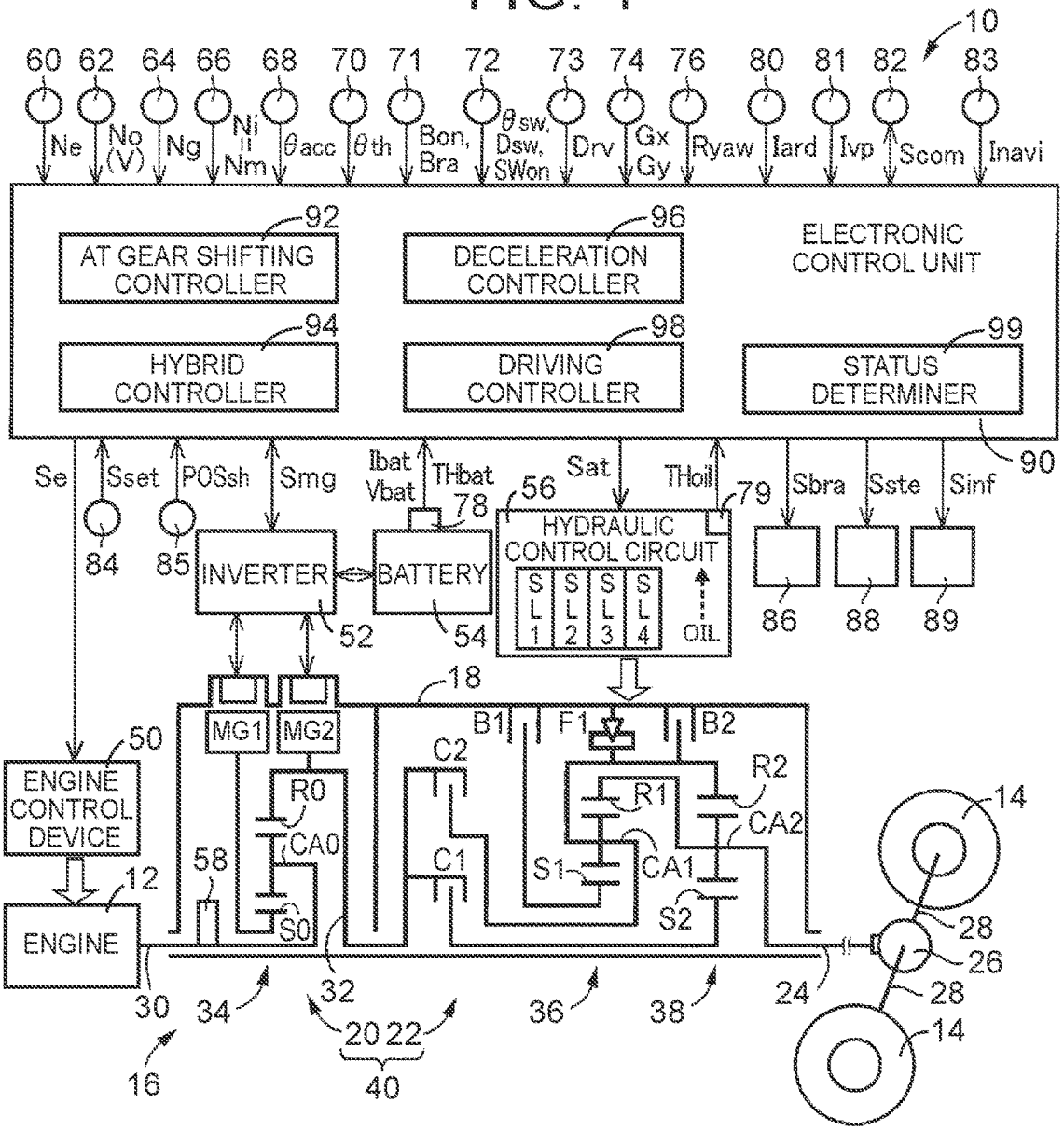
FIG. 1 is a diagram for describing a schematic structure of a vehicle to which the present disclosure is applied, and also describing a main part of control functions and a control system for various types of control on the vehicle.
FIG. 2 is an operation table for describing relationships between gear shifting operations of a mechanical stepped transmission unit of FIG. 1 and combinations of operations of engagement devices for use in the gear shifting operations.

FIG. 1 is a diagram for describing the overall structure of a vehicle 10 to which the present disclosure is applied, and also describing a main part of a control system for various types of control on the vehicle 10. In FIG. 1, the vehicle 10 includes an engine 12, a first rotator MG1, and a second rotator MG2. The vehicle 10 further includes driving wheels 14 and a power transmission device 16 provided on a power transmission path between the engine 12 and the driving wheels 14.

The engine 12 is a drive source configured to generate a driving force. The engine 12 is a gasoline engine, a diesel engine, or other publicly known internal combustion engines. An engine torque Te that is an output torque of the engine 12 is controlled by controlling an engine control device 50 including a throttle actuator, a fuel injection device, and an ignition device provided in the vehicle 10 by an electronic control unit 90 described later.

Each of the first rotator MG1 and the second rotator MG2 is a so-called motor generator that is a rotating electrical machine having a function of an electric motor (motor) and a function of an electric generator (generator). The first rotator MG1 and the second rotator MG2 are connected to a battery 54 in the vehicle 10 via an inverter 52 in the vehicle 10. An MG1 torque Tg that is an output torque of the first rotator MG1 and an MG2 torque Tm that is an output torque of the second rotator MG2 are controlled by controlling the inverter 52 by the electronic control unit 90 described later. Regarding the output torque of the rotator, for example, a positive torque on an accelerating side is a power running torque and a negative torque on a decelerating side is a regenerative torque in a case of positive rotation in the same rotational direction as that during operation of the engine 12. The battery 54 is a power storage device configured to exchange electric power with the first rotator MG1 and the second rotator MG2. The first rotator MG1 and the second rotator MG2 are provided in a case 18 that is a non-rotational member attached to a vehicle body.

The power transmission device 16 includes an electric continuously variable transmission unit 20 and a mechanical stepped transmission unit 22 arranged in series on a common axis center in the case 18. The electric continuously variable transmission unit 20 is coupled to the engine 12 directly or indirectly via a damper (not illustrated) or the like. The mechanical stepped transmission unit 22 is coupled to an output side of the electric continuously variable transmission unit 20. The power transmission device 16 further includes a differential gear unit 26 and a pair of axles 28. The differential gear unit 26 is coupled to an output shaft 24 that is an output rotational member of the mechanical stepped transmission unit 22. The axles 28 are coupled to the differential gear unit 26. The axles 28 are coupled to the driving wheels 14. The electric continuously variable transmission unit 20 is hereinafter referred to as "continuously variable transmission unit 20". The mechanical stepped transmission unit 22 is hereinafter referred to as "stepped transmission unit 22". The continuously variable transmission unit 20, the stepped transmission unit 22, and other devices are substantially symmetrical about the common axis center. In FIG. 1, a lower half below the axis center is omitted. For example, the common axis center serves as axis centers of a crankshaft of the engine 12 and a coupling shaft 30 that is an input rotational member of the continuously variable transmission unit 20 coupled to the crankshaft.

The continuously variable transmission unit 20 includes the first rotator MG1 and a differential mechanism 34 serving as a power split device configured to mechanically split driving power of the engine 12 to the first rotator MG1 and an intermediate transmission member 32 that is an output rotational member of the continuously variable transmission unit 20. The second rotator MG2 is coupled to the intermediate transmission member 32 to transmit the driving power. The continuously variable transmission unit 20 is an electric continuously variable transmission in which a differential state of the differential mechanism 34 is controlled by controlling an operation state of the first rotator MG1. The continuously variable transmission unit 20 operates as an electric continuously variable transmission configured to change a gear ratio $\gamma 0$ (=engine speed Ne/MG2 rotation speed Nm). The engine speed Ne is a rotation speed of the engine 12, and takes the same value as that of an input rotation speed of the continuously variable transmission unit 20, that is, a rotation speed of the coupling shaft 30. The MG2 rotation speed Nm is a rotation speed of the second rotator MG2, and takes the same value as that of an output rotation speed of the continuously variable transmission unit 20, that is, a rotation speed of the intermediate transmission member 32. The first rotator MG1 can control the engine speed Ne, and corresponds to a differential rotator. The control on the operation state of the first rotator MG1 is operation control on the first rotator MG1.

The differential mechanism 34 is a single-pinion planetary gearing, and includes a sun gear S0, a carrier CA0, and a ring gear R0. The engine 12 is coupled to the carrier CA0 via the coupling shaft 30 to transmit the driving power. The first rotator MG1 is coupled to the sun gear S0 to transmit the driving power. The second rotator MG2 is coupled to the ring gear R0 to transmit the driving power. In the differential mechanism 34, the carrier CA0 functions as an input element, the sun gear S0 functions as a reactive element, and the ring gear R0 functions as an output element.

The stepped transmission unit 22 is a mechanical gear shifting mechanism serving as a stepped transmission constituting a part of a power transmission path between the intermediate transmission member 32 and the driving wheels 14, that is, the continuously variable transmission unit 20 and the driving wheels 14. The intermediate transmission member 32 also functions as an input rotational member of the stepped transmission unit 22. The second rotator MG2 is coupled to the intermediate transmission member 32 to rotate together. The second rotator MG2 functions as a drive source configured to generate a driving force, and corresponds to a traveling drive rotator. The engine 12 is coupled to an input side of the continuously variable transmission unit 20. Thus, the stepped transmission unit 22 is an automatic transmission constituting a part of a power transmission path between the drive source (engine 12 and second rotator MG2) and the driving wheels 14. The second rotator MG2 is coupled to the power transmission path between the engine 12 and the driving wheels 14 to transmit the driving power. That is, the second rotator MG2 is coupled to the driving wheels 14 via the stepped transmission unit 22 to transmit the driving power. Examples of the stepped transmission unit 22 include a publicly known planetary gearing automatic transmission including a plurality of sets of planetary gearings being a first planetary gearing 36 and a second planetary gearing 38, and a plurality of engagement devices being a clutch C1, a clutch C2, a brake B1, and a brake B2, including a one-way clutch F1. The clutch C1, the clutch C2, the brake B1, and the brake B2 are hereinafter referred to simply as "engagement devices CB" unless otherwise distinguished.

Each engagement device CB is a hydraulic friction engagement device including a multi-disc or single-disc clutch or brake to be pushed by a hydraulic actuator, or a band brake to be tightened by the hydraulic actuator. A control state such as an engaged or disengaged state, that is, an operation state of each engagement device CB is switched by changing a torque capacity using regulated engagement pressures of the engagement device CB that are output from solenoid valves SL1 to SL4 of a hydraulic control circuit 56 in the vehicle 10.

In the stepped transmission unit 22, rotational elements of the first planetary gearing 36 and the second planetary gearing 38 are partially coupled together or coupled to the intermediate transmission member 32, the case 18, or the output shaft 24 directly or indirectly via the engagement devices CB and the one-way clutch F1. The rotational elements of the first planetary gearing 36 are a sun gear S1, a carrier CA1, and a ring gear R1. The rotational elements of the second planetary gearing 38 are a sun gear S2, a carrier CA2, and a ring gear R2.

The stepped transmission unit 22 is a stepped transmission configured to set any gear stage out of a plurality of gear stages different in a gear ratio γat (=AT input rotation speed Ni/output rotation speed No) by engaging, for example, predetermined engagement devices out of the plurality of engagement devices. That is, the stepped transmission unit 22 switches the gear stage, that is, executes gear shifting by engaging any of the engagement devices. In this embodiment, the gear stage set by the stepped transmission unit 22 is referred to as "AT gear stage". The AT input rotation speed Ni is an input rotation speed of the stepped transmission unit 22, that is, a rotation speed of the intermediate transmission member 32, and takes the same value as that of the MG2 rotation speed Nm. The AT input rotation speed Ni can be represented by the MG2 rotation speed Nm. The output rotation speed No is an output rotation speed of the stepped transmission unit 22, that is, a rotation speed of the output shaft 24. The output rotation speed No is also an output rotation speed of a complex transmission 40 that is an overall transmission including a combination of the continuously variable transmission unit 20 and the stepped transmission unit 22. The complex transmission 40 is an automatic transmission constituting a part of the power transmission path between the engine 12 and the driving wheels 14. The engine speed Ne is also an input rotation speed of the complex transmission 40.

As illustrated in an engagement operation table of FIG. 2, the stepped transmission unit 22 sets, for example, four forward AT gear stages that are a first AT gear stage ("1st" in FIG. 2) to a fourth AT gear stage ("4th" in FIG. 2) as a plurality of AT gear stages. The gear ratio γat is highest at the first AT gear stage, and decreases at an AT gear stage on a higher side. For example, a reverse AT gear stage ("Rev" in FIG. 2) is set by engaging the clutch C1 and the brake B2. That is, the first AT gear stage, for example, is set for reverse travel. The engagement operation table of FIG. 2 is a summary of relationships between the AT gear stages and operation states of the engagement devices. That is, the engagement operation table of FIG. 2 is a summary of relationships between the AT gear stages and the predetermined engagement devices to be engaged at the individual AT gear stages. In FIG. 2, "O" represents engagement, "Δ" represents engagement at the time of engine braking or coasting downshift of the stepped transmission unit 22, and a blank field represents disengagement.

In the stepped transmission unit 22, the AT gear stages to be set depending on, for example, a driver's accelerator operation or a vehicle speed V are switched, that is, the AT gear stages are selectively set by the electronic control unit 90 described later. For example, in gear shifting control on the stepped transmission unit 22, gear shifting is executed by changing the engagement state of any engagement device CB, that is, by switching engagement and disengagement of any engagement device CB. This gear shifting is so-called clutch-to-clutch gear shifting.

The vehicle 10 further includes a mechanical oil pump (MOP) 58 and an electric oil pump (not illustrated). The MOP 58 is coupled to the coupling shaft 30 and rotated along with rotation of the engine 12 to discharge hydraulic oil OIL for use in the power transmission device 16. For example, the electric oil pump (not illustrated) is driven to discharge the hydraulic oil OIL when the engine 12 is stopped, that is, when the MOP 58 is not driven. The hydraulic oil OIL discharged by the MOP 58 or the electric oil pump (not illustrated) is supplied to the hydraulic control circuit 56. The operation state of each engagement device CB is switched by the engagement pressures regulated by the hydraulic control circuit 56 based on the hydraulic oil OIL.

Figure 3:
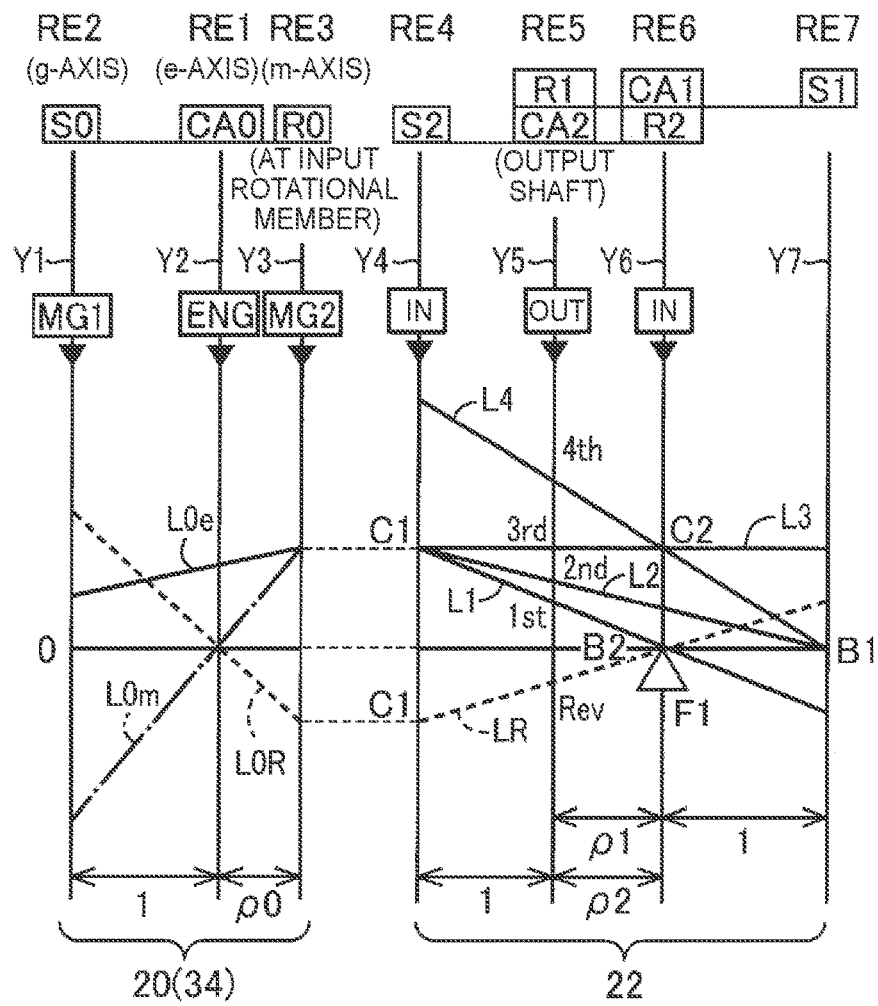
FIG. 3 is a nomograph illustrating a relative relationship among rotation speeds of rotational elements of an electric continuously variable transmission unit and the mechanical stepped transmission unit of FIG. 1.

FIG. 3 is a nomograph illustrating a relative relationship among rotation speeds of the rotational elements of the continuously variable transmission unit 20 and the stepped transmission unit 22. In FIG. 3, three vertical lines Y1, Y2, and Y3 corresponding to the three rotational elements of the differential mechanism 34 of the continuously variable transmission unit 20 are a g-axis representing a rotation speed of the sun gear S0 corresponding to a second rotational element RE2, an e-axis representing a rotation speed of the carrier CA0 corresponding to a first rotational element RE1, and an m-axis representing a rotation speed of the ring gear R0 corresponding to a third rotational element RE3 (that is, the input rotation speed of the stepped transmission unit 22) in order from the left. Four vertical lines Y4, Y5, Y6, and Y7 of the stepped transmission unit 22 are axes representing a rotation speed of the sun gear S2 corresponding to a fourth rotational element RE4, a rotation speed of the ring gear R1 and the carrier CA2 coupled together and corresponding to a fifth rotational element RE5 (that is, the rotation speed of the output shaft 24), a rotation speed of the carrier CA1 and the ring gear R2 coupled together and corresponding to a sixth rotational element RE6, and a rotation speed of the sun gear S1 corresponding to a seventh rotational element RE7 in order from the left. Distances between the vertical lines Y1, Y2, and Y3 are set based on a gear ratio ρ0 of the differential mechanism 34. Distances between the vertical lines Y4, Y5, Y6, and Y7 are set based on a gear ratio ρ1 of the first planetary gearing 36 and a gear ratio ρ2 of the second planetary gearing 38. In the relationship among the vertical axes of the nomograph, when a distance between the sun gear and the carrier corresponds to "1", a distance between the carrier and the ring gear corresponds to a gear ratio ρ of the planetary gearing (=number of teeth of sun gear/number of teeth of ring gear).

In the representation using the nomograph of FIG. 3, the differential mechanism 34 of the continuously variable transmission unit 20 transmits the rotation of the engine 12 to the stepped transmission unit 22 via the intermediate transmission member 32 by coupling the engine 12 (see "ENG" in FIG. 3) to the first rotational element RE1, the first rotator MG1 (see "MG1" in FIG. 3) to the second rotational element RE2, and the second rotator MG2 (see "MG2" in FIG. 3) to the third rotational element RE3 that rotates together with the intermediate transmission member 32. In the continuously variable transmission unit 20, relationships between the rotation speed of the sun gear S0 and the rotation speed of the ring gear R0 are represented by straight lines L0e, L0m, and L0R crossing the vertical line Y2, respectively.

In the stepped transmission unit 22, the fourth rotational element RE4 is selectively coupled to the intermediate transmission member 32 via the clutch C1, the fifth rotational element RE5 is coupled to the output shaft 24, the sixth rotational element RE6 is selectively coupled to the intermediate transmission member 32 via the clutch C2 and to the case 18 via the brake B2, and the seventh rotational element RE7 is selectively coupled to the case 18 via the brake B1. In the stepped transmission unit 22, the rotation speeds of the output shaft 24 at "1st", "2nd", "3rd", "4th", and "Rev" are represented by straight lines L1, L2, L3, L4, and LR crossing the vertical line Y5 through engagement/disengagement control on the engagement devices CB, respectively.

In FIG. 3, the continuous straight lines L0e, L1, L2, L3, and L4 represent relative speeds of the rotational elements during forward travel in a hybrid vehicle (HV) travel mode in which the vehicle can execute hybrid travel (=HV travel) using at least the engine 12 as the drive source. The HV travel is engine travel using at least the driving force from the engine 12. In the HV travel mode, when the MG1 torque Tg that is a negative reaction torque of the first rotator MG1 is input to the sun gear S0 against the positive engine torque Te input to the carrier CA0 in the differential mechanism 34, a direct engine torque Td $(=Te/(1+\rho 0)=-(1/\rho 0)\times Tg)$ that is a positive torque in the positive rotation emerges in the ring gear R0. In response to a demanded driving force Frdem, a combined torque of the direct engine torque Td and the MG2 torque Tm is transmitted, as a driving torque in a forward direction of the vehicle 10, to the driving wheels 14 via the stepped transmission unit 22 that sets any AT gear stage out of the first AT gear stage to the fourth AT gear stage. The first rotator MG1 functions as the electric generator when generating a negative torque in the positive rotation. Electric power Wg generated by the first rotator MG1 is charged into the battery 54 or consumed by the second rotator MG2. The second rotator MG2 outputs the MG2 torque Tm by using all or part of the generated electric power Wg or by using electric power from the battery 54 in addition to the generated electric power Wg.

In FIG. 3, the long dashed short dashed straight line L0m and the continuous straight lines L1, L2, L3, and L4 represent relative speeds of the rotational elements during forward travel in an electric vehicle (EV) travel mode in which the vehicle can execute motor travel (=EV travel) using the second rotator MG2 as the drive source while stopping the operation of the engine 12. The EV travel is motor travel using only the driving force from the second rotator MG2. In the EV travel during the forward travel in the EV travel mode, the rotation of the carrier CA0 is zero, and the MG2 torque Tm that is a positive torque in the positive rotation is input to the ring gear R0. At this time, the first rotator MG1 coupled to the sun gear S0 is idled by negative rotation in a non-load state. That is, during the forward travel in the EV travel mode, the engine 12 is not driven, the engine speed Ne is zero, and the MG2 torque Tm is transmitted, as a driving torque in the forward direction of the vehicle 10, to the driving wheels 14 via the stepped transmission unit 22 that sets any AT gear stage out of the first AT gear stage to the fourth AT gear stage. The MG2 torque Tm is a positive power running torque in the positive rotation.

In FIG. 3, the dashed straight lines L0R and LR represent relative speeds of the rotational elements during reverse travel in the EV travel mode. During the reverse travel in the EV travel mode, the MG2 torque Tm that is a negative torque in negative rotation is input to the ring gear R0, and is transmitted, as a driving torque in a reverse direction of the vehicle 10, to the driving wheels 14 via the stepped transmission unit 22 that sets the first AT gear stage. In the vehicle 10, the reverse travel can be executed by the electronic control unit 90 described later that causes the second rotator MG2 to output the reverse MG2 torque Tm having a positive/negative sign opposite to that of the forward MG2 torque Tm during the forward travel in a state in which, for example, the first AT gear stage that is the forward AT gear stage on the low side is set among the plurality of AT gear stages. The MG2 torque Tm is a negative power running torque in the negative rotation. Also in the HV travel mode, the negative rotation of the second rotator MG2 can be executed as indicated by the straight line L0R. Therefore, the reverse travel can be executed similarly to the EV travel mode.

The vehicle 10 is a hybrid vehicle including the engine 12 and the second rotator MG2 as the traveling drive sources. In the power transmission device 16, the driving power output from the engine 12 or the second rotator MG2 is transmitted to the stepped transmission unit 22, and is transmitted from the stepped transmission unit 22 to the driving wheels 14 via the differential gear unit 26 and the like. Thus, the power transmission device 16 transmits the driving force from the drive source (engine 12 or second rotator MG2) to the driving wheels 14. The driving power has the same meaning as that of the torque or force unless otherwise distinguished.

Referring back to FIG. 1, the vehicle 10 includes the electronic control unit 90 serving as a controller including a control device for the vehicle 10 that is related to control on, for example, the engine 12, the continuously variable transmission unit 20, and the stepped transmission unit 22. FIG. 1 is a diagram illustrating an input/output system of the electronic control unit 90, and is also a functional block diagram for describing a main part of control functions of the electronic control unit 90. The electronic control unit 90 includes a so-called microcomputer including a central processing unit (CPU), a random-access memory (RAM), a read-only memory (ROM), and an input/output interface. The CPU executes various types of control on the vehicle 10 by processing signals based on programs prestored in the ROM while using a temporary storage function of the RAM. The electronic control unit 90 includes engine control, rotator control, and hydraulic control computers as necessary.

The electronic control unit 90 is supplied with various signals (for example, the engine speed Ne, the output rotation speed No corresponding to the vehicle speed V, an MG1 rotation speed Ng of the first rotator MG1, the MG2 rotation speed Nm having the same value as that of the AT input rotation speed Ni, a driver's accelerator operation amount θacc indicating the magnitude of a driver's accelerating operation, a throttle valve opening degree θth that is an opening degree of an electronic throttle valve, a brake-ON signal Bon indicating a state in which the driver is operating a brake pedal for applying wheel brakes, a brake operation amount Bra indicating the magnitude of a driver's operation for depressing the brake pedal, a steering angle θsw and a steering direction Dsw of a steering wheel in the vehicle 10, a steering-ON signal SWon indicating a state in which the driver is gripping the steering wheel, a driver's condition signal Drv indicating driver's conditions, a longitudinal acceleration Gx and a lateral acceleration Gy of the vehicle 10, a yaw rate Ryaw that is a rotation angle velocity about a vertical axis of the vehicle 10, a battery temperature THbat, a battery charge/discharge current Ibat, and a battery voltage Vbat of the battery 54, a hydraulic oil temperature THoil of the hydraulic oil, vehicle periphery information Iard, positional information Ivp, a communication signal Scom, navigation information Inavi, a driving assistance setting signal Sset indicating driver's settings on driving assistance control CTs such as autonomous driving control or cruise control, and an operation position POSsh of a shift lever in the vehicle 10) based on detection values from various sensors in the vehicle 10 (for example, an engine speed sensor 60, an output rotation speed sensor 62, an MG1 rotation speed sensor 64, an MG2 rotation speed sensor 66, an accelerator operation amount sensor 68, a throttle valve opening degree sensor 70, a brake pedal sensor 71, a steering sensor 72, a driver's condition sensor 73, a G-sensor 74, a yaw rate sensor 76, a battery sensor 78, an oil temperature sensor 79, a vehicle periphery information sensor 80, a vehicle position sensor 81, an external network communication antenna 82, a navigation system 83, a driving assistance setting switch unit 84, and a shift position sensor 85).

The driver's accelerator operation amount is an accelerating operation amount that is an operation amount of an accelerator operation member such as an accelerator pedal, and is a driver's demanded output amount for the vehicle 10. As the driver's demanded output amount, the throttle valve opening degree θth or the like may be used as well as the accelerator operation amount θacc.

The driver's condition sensor 73 includes at least one of a camera configured to image driver's facial expressions or pupils and a biological information sensor configured to detect driver's biological information, and acquires driver's conditions such as driver's line of sight, face direction, eyeball or face motion, and heartbeat.

The vehicle periphery information sensor 80 includes at least one of a Lidar sensor, a radar, and an on-board camera, and directly acquires the vehicle periphery information Iard on the periphery of the vehicle 10. The vehicle periphery information Iard is related to a traveling road and objects around the vehicle. For example, the Lidar sensor is a plurality of Lidar sensors configured to detect objects ahead of, beside, and behind the vehicle 10, or a single Lidar sensor configured to detect objects around the vehicle 10. The Lidar sensor outputs object information related to the detected objects as the vehicle periphery information Iard. For example, the radar is a plurality of radars configured to detect objects ahead of the vehicle 10, near the front of the vehicle 10, and near the rear of the vehicle 10, and outputs object information related to the detected objects as the vehicle periphery information Iard. The object information from the Lidar sensor or the radar includes distances and directions of the detected objects from the vehicle 10. For example, the on-board camera is a monocular or stereo camera configured to image areas ahead of or behind the vehicle 10, and outputs imaging information as the vehicle periphery information Iard. The imaging information includes information on lanes of a traveling road, traffic signs on the traveling road, parking spaces, and other vehicles, pedestrians, or obstacles on the traveling road.

The vehicle position sensor 81 includes a Global Positioning System (GPS) antenna. The positional information Ivp includes driver's vehicle position information indicating a current position of the vehicle 10 on the ground or a map based on, for example, a GPS signal (trajectory signal) issued from a GPS satellite.

The navigation system 83 is a publicly known navigation system including a display and a loudspeaker. The navigation system 83 determines a driver's vehicle position on prestored map data based on the positional information Ivp. The navigation system 83 displays the driver's vehicle position on a map displayed on the display. When a destination is input, the navigation system 83 calculates a traveling route from a departing location to the destination, and causes the display and the loudspeaker to give guidance about, for example, the traveling route to the driver. The navigation information Inavi includes map information such as road information and facility information based on the map data prestored in the navigation system 83. The road information includes information on road types such as downtown roads, suburban roads, mountain roads, and highways, that is, expressways, branches and junctions of roads, gradients of roads, and speed limits. The facility information includes information on types, locations, and names of sites such as supermarkets, shops, restaurants, parking areas, parks, repair shops for the vehicle 10, a home, and service areas on expressways. The service area is a site including facilities such as a parking area, a diner, and a gas station on an expressway. The road information or the like in the navigation information Inavi may serve also as the vehicle periphery information Iard.

The driving assistance setting switch unit 84 includes an autonomous driving selection switch for autonomous driving control, a cruise switch for cruise control, a switch for setting a vehicle speed during the cruise control, a switch for setting a vehicle-to-vehicle distance from a preceding vehicle during the cruise control, and a switch for lane keeping control in which the vehicle travels while keeping a set lane.

The communication signal Scom includes road traffic information transmitted to and received from a center that is an external apparatus such as a road traffic information communication system, and/or vehicle-to-vehicle communication information directly transmitted to and received from other vehicles near the vehicle 10 without intervention of the center. The road traffic information includes information on traffic jams, accidents, constructions, required periods, and parking areas on roads. The vehicle-to-vehicle communication information includes vehicle information, travel information, and traffic environment information. The vehicle information includes information indicating a vehicle type such as a passenger car, a truck, or a motorcycle. The travel information includes information on the vehicle speed V, positional information, information on an operation for the brake pedal, information on blinking of a direction indicator lamp, and information on blinking of a hazard warning signal lamp. The traffic environment information includes information on traffic jams and constructions on roads.

The electronic control unit 90 outputs various command signals (for example, an engine control command signal Se for controlling the engine 12, a rotator control command signal Smg for controlling the first rotator MG1 and the second rotator MG2, a hydraulic control command signal Sat for controlling the operation states of the engagement devices CB, a communication signal Scom, a brake control command signal Sbra for controlling a braking torque Tb of the wheel brakes, a steering control command signal Sste for controlling steering of the wheels (in particular, front wheels), and an information reporting control command signal Sinf for giving an alert or notification to the driver) to devices in the vehicle 10 (for example, the engine control device 50, the inverter 52, the hydraulic control circuit 56, the external network communication antenna 82, a wheel braking device 86, a steering device 88, and an information reporting device 89).

The wheel braking device 86 applies the braking torque Tb of the wheel brakes to the wheels. The braking torque Tb is a negative torque on a braking side in a driving torque Tr. The wheel braking device 86 supplies a braking hydraulic pressure to wheel cylinders of the wheel brakes in response to, for example, a driver's operation for depressing the brake pedal. In the wheel braking device 86, a master cylinder hydraulic pressure generated from a brake master cylinder and having a magnitude corresponding to the brake operation amount Bra is normally supplied to the wheel cylinders as the braking hydraulic pressure. In the wheel braking device 86, for example, during anti-lock braking system (ABS) control, anti-skid control, automatic vehicle speed control, or autonomous driving control, a braking hydraulic pressure necessary for each type of control is supplied to the wheel cylinders to generate the braking torque Tb of the wheel brakes. The wheels are the driving wheels 14 and driven wheels (not illustrated).

For example, the steering device 88 applies an assist torque to a steering system of the vehicle 10 based on the vehicle speed V, the steering angle θsw, the steering direction Dsw, and the yaw rate Ryaw. For example, during the autonomous driving control, the steering device 88 applies a torque for controlling steering of the front wheels to the steering system of the vehicle 10.

For example, the information reporting device 89 gives an alert or notification to the driver in the event of a malfunction related to the travel of the vehicle 10 or a decrease in functions related to the travel of the vehicle 10. The information reporting device 89 includes a display device such as a monitor, a display, or an alarm lamp, and/or an audio output device such as a loudspeaker or a beeper. The display device gives a visual alert or notification to the driver. The audio output device gives an auditory alert or notification to the driver.

To implement various types of control on the vehicle 10, the electronic control unit 90 includes AT gear shifting control means, that is, an AT gear shifting controller 92, hybrid control means, that is, a hybrid controller 94, deceleration control means, that is, a deceleration controller 96, and driving control means, that is, a driving controller 98.

Figure 4:
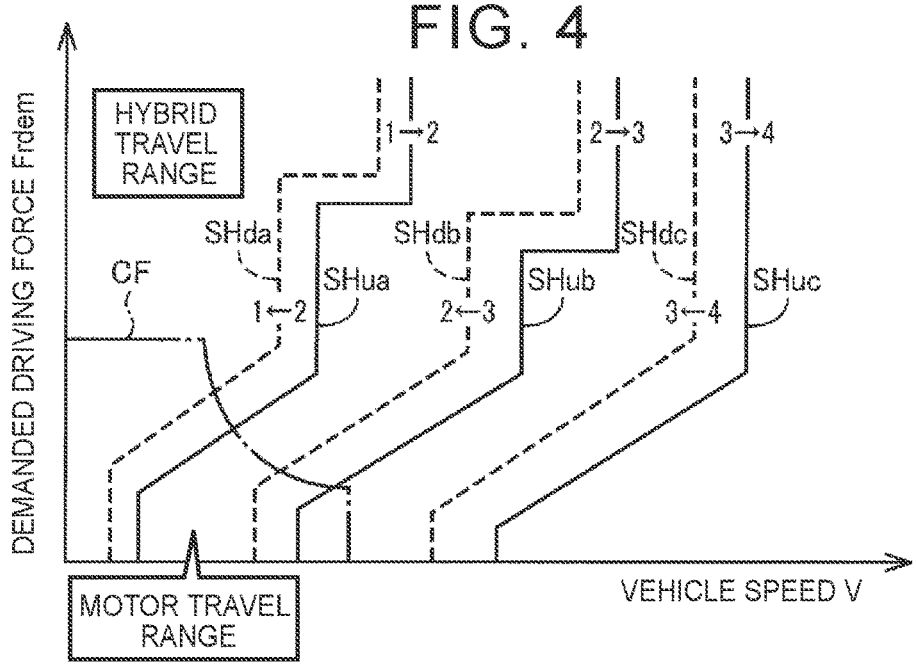
FIG. 4 is a diagram illustrating examples of and a relationship between an automatic transmission (AT) gear stage shifting map for use in gear shifting control of the mechanical stepped transmission unit of FIG. 1 and a travel mode switching map for use in travel mode switching control.

The AT gear shifting controller 92 executes gear shifting determination on the stepped transmission unit 22 by using, for example, an AT gear stage shifting map illustrated in FIG. 4, which shows a predetermined relationship, that is, a relationship determined through experiments or designing and stored in advance. The AT gear shifting controller 92 outputs the hydraulic control command signal Sat to the hydraulic control circuit 56 as necessary to execute gear shifting control on the stepped transmission unit 22.

In FIG. 4, the AT gear stage shifting map shows a predetermined relationship in which, for example, a plurality of types of predetermined gear shifting lines SH for the gear shifting determination on the stepped transmission unit 22 is provided on a two-dimensional coordinate system having the vehicle speed V and the demanded driving force Frdem as variables. For example, the output rotation speed No may be used in place of the vehicle speed V. For example, a demanded driving torque Trdem, the accelerator operation amount θacc, or the throttle valve opening degree θth may be used in place of the demanded driving force Frdem. The gear shifting lines SH include continuous upshift lines SHua, SHub, and SHuc for upshift determination, and dashed downshift lines SHda, SHdb, and SHdc for downshift determination.

The hybrid controller 94 has a function of engine control means, that is, an engine controller configured to control an operation of the engine 12, and a function of rotator control means, that is, a rotator controller configured to control operations of the first rotator MG1 and the second rotator MG2 via the inverter 52. With those control functions, for example, hybrid drive control is executed by using the engine 12, the first rotator MG1, and the second rotator MG2.

For example, the hybrid controller 94 calculates the demanded driving force Frdem of the driving wheels 14 as a demanded drive amount by applying the accelerator operation amount θacc and the vehicle speed V to a demanded drive amount map showing a predetermined relationship. As the demanded drive amount, the demanded driving torque Trdem [Nm] of the driving wheels 14, demanded driving power Prdem [W] of the driving wheels 14, or a demanded AT output torque of the output shaft 24 may be used as well as the demanded driving force Frdem [N]. For example, the hybrid controller 94 outputs the engine control command signal Se for controlling the engine 12 and the rotator control command signal Smg for controlling the first rotator MG1 and the second rotator MG2 to achieve the demanded driving power Prdem based on the demanded driving torque Trdem and the vehicle speed V in consideration of chargeable electric power Win and dischargeable electric power Wout of the battery 54. For example, the engine control command signal Se is a command value of engine power Pe of the engine 12 that outputs an engine torque Te at an engine speed Ne of the command output timing. For example, the rotator control command signal Smg is a command value of the electric power Wg to be generated by the first rotator MG1 that outputs an MG1 torque Tg as a reaction torque of the engine torque Te at an MG1 rotation speed Ng of the command output timing, and is a command value of a power consumption Wm of the second rotator MG2 that outputs an MG2 torque Tm at an MG2 rotation speed Nm of the command output timing.

The chargeable electric power Win of the battery 54 is inputtable electric power that defines a limit of input electric power of the battery 54. The dischargeable electric power Wout of the battery 54 is outputtable electric power that defines a limit of output electric power of the battery 54. For example, the chargeable electric power Win and the dischargeable electric power Wout of the battery 54 are calculated by the electronic control unit 90 based on the battery temperature THbat and a state of charge SOC [%] corresponding to a charging amount of the battery 54. The state of charge SOC of the battery 54 indicates a charging status of the battery 54, and is calculated by the electronic control unit 90 based on, for example, the battery charge/discharge current Ibat and the battery voltage Vbat.

For example, when the continuously variable transmission unit 20 operates as the continuously variable transmission and the overall complex transmission 40 operates as the continuously variable transmission, the hybrid controller 94 changes the gear ratio γ0 of the continuously variable transmission unit 20 by executing stepless gear shifting control on the continuously variable transmission unit 20 such that the electric power Wg to be generated by the first rotator MG1 is controlled and the engine 12 is controlled to have an engine speed Ne and an engine torque Te that can obtain engine power Pe for achieving the demanded driving power Prdem in consideration of, for example, an optimum engine operating point. As a result of this control, a gear ratio γt (=Ne/No) of the complex transmission 40 when operating as the continuously variable transmission is controlled. For example, the optimum engine operating point is preset as an engine operating point at which the total fuel efficiency of the vehicle 10 in consideration of the fuel efficiency of the engine 12 and charging/discharging efficiency of the battery 54 is highest when achieving demanded engine power Pedem. The engine operating point is an operating point of the engine 12 that is represented by the engine speed Ne and the engine torque Te. Thus, in the power transmission device 16, the overall complex transmission 40 including the continuously variable transmission unit 20 and the stepped transmission unit 22 arranged in series can serve as the continuously variable transmission by the stepped transmission unit 22 that sets the AT gear stages and the continuously variable transmission unit 20 that operates as the continuously variable transmission.

The continuously variable transmission unit 20 may execute gear shifting like the stepped transmission. Therefore, the overall complex transmission 40 of the power transmission device 16 can execute gear shifting like the stepped transmission by the stepped transmission unit 22 that sets the AT gear stages and the continuously variable transmission unit 20 that executes gear shifting like the stepped transmission. That is, the stepped transmission unit 22 and the continuously variable transmission unit 20 of the complex transmission 40 can be controlled to selectively establish a plurality of gear stages different in the gear ratio $\gamma t$ that is a ratio of the engine speed Ne to the output rotation speed No. In this embodiment, the gear stages established by the complex transmission 40 are referred to as "simulated gear stages". The gear ratio $\gamma t$ is a total gear ratio set by the continuously variable transmission unit 20 and the stepped transmission unit 22 arranged in series, and is a value obtained by multiplying the gear ratio $\gamma 0$ of the continuously variable transmission unit 20 and the gear ratio $\gamma$at of the stepped transmission unit 22 together ($\gamma t = \gamma 0 \times \gamma at$).

For example, the simulated gear stages are allocated so that one or more types of simulated gear stage are established for each AT gear stage of the stepped transmission unit 22 by a combination of each AT gear stage of the stepped transmission unit 22 and one or more types of gear ratio $\gamma 0$ of the continuously variable transmission unit 20. For example, the simulated gear stages are preset so that a first simulated gear stage to a third simulated gear stage are established for the first AT gear stage, a fourth simulated gear stage to a sixth simulated gear stage are established for the second AT gear stage, a seventh simulated gear stage to a ninth simulated gear stage are established for the third AT gear stage, and a tenth simulated gear stage is established for the fourth AT gear stage. In the complex transmission 40, different simulated gear stages are established for a certain AT gear stage by controlling the continuously variable transmission unit 20 to have an engine speed Ne that achieves a predetermined gear ratio $\gamma t$ in relation to the output rotation speed No. In the complex transmission 40, the simulated gear stages are switched by controlling the continuously variable transmission unit 20 in synchronization with switching of the AT gear stages.

For example, when the continuously variable transmission unit 20 executes gear shifting like the stepped transmission and the overall complex transmission 40 executes gear shifting like the stepped transmission, the hybrid controller 94 executes gear shifting determination on the complex transmission 40 by using, for example, a simulated gear stage shifting map showing a predetermined relationship, and executes gear shifting control on the continuously variable transmission unit 20 to selectively establish a plurality of simulated gear stages in cooperation with gear shifting control on the AT gear stages of the stepped transmission unit 22 by the AT gear shifting controller 92. The simulated gear stages can be established by controlling the engine speed Ne in relation to the output rotation speed No by using the first rotator MG1 to keep the respective gear ratios $\gamma t$. The gear ratio $\gamma t$ of each simulated gear stage need not essentially be a constant value over the entire range of the output rotation speed No, and may be changed within a predetermined range or limited by, for example, upper and lower limits of the rotation speed of each portion. Thus, the hybrid controller 94 can execute gear shifting control for changing the engine speed Ne as in the case of stepped gear shifting. For example, the simulated stepped gear shifting control for causing the overall complex transmission 40 to execute gear shifting like the stepped transmission may be executed with priority over the stepless gear shifting control for causing the overall complex transmission 40 to operate as the continuously variable transmission only when the driver selects a sporty travel mode or other travel modes oriented to traveling performance or the demanded driving torque Trdem is relatively large. The simulated stepped gear shifting control may basically be executed unless a predetermined execution restriction is imposed.

The hybrid controller 94 selectively establishes the EV travel mode or the HV travel mode as the travel mode depending on traveling conditions. For example, the hybrid controller 94 uses a travel mode switching map illustrated in FIG. 4, which shows a predetermined relationship, to establish the EV travel mode in an EV travel range in which the demanded driving power Prdem is relatively small, and establish the HV travel mode in an HV travel range in which the demanded driving power Prdem is relatively large.

In FIG. 4, the travel mode switching map shows a predetermined relationship in which, for example, a border line of the HV travel range and the EV travel range for switching between the HV travel mode and the EV travel mode is provided on the two-dimensional coordinate system having the vehicle speed V and the demanded driving force Frdem as variables. For example, the border line is a predetermined long dashed short dashed travel range switching line CF for determination on switching between the EV travel and the HV travel. Since the switching of the travel modes involves switching of the traveling drive sources, the travel range switching line CF is also a drive source switching line. In FIG. 4, the travel mode switching map is illustrated together with the AT gear stage shifting map for convenience.

Even if the demanded driving power Prdem is in the EV travel range, the hybrid controller 94 establishes the HV travel mode, for example, when the state of charge SOC of the battery 54 is lower than a predetermined engine start threshold or the engine 12 needs to be warmed. The engine start threshold is a predetermined threshold for determination as to whether the state of charge SOC requires the battery 54 to be charged by forcibly starting the engine 12.

When the HV travel mode is established while the operation of the engine 12 is stopped, the hybrid controller 94 executes engine start control for starting the engine 12. To start the engine 12, for example, the hybrid controller 94 increases the engine speed Ne by using the first rotator MG1, and ignites the engine 12 when the engine speed Ne is equal to or higher than a predetermined ignitable rotation speed. That is, the hybrid controller 94 starts the engine 12 by cranking the engine 12 using the first rotator MG1.

The deceleration controller 96 calculates a demanded deceleration Grdem as a demanded deceleration amount based on, for example, a driver's accelerator operation (for example, the accelerator operation amount $\theta$acc or a decrease rate of the accelerator operation amount $\theta$acc), the vehicle speed V, a gradient of a downward slope, and a driver's brake operation for applying the wheel brakes (for example, the brake operation amount Bra or an increase rate of the brake operation amount Bra), and sets a demanded braking torque Tbdem for achieving the demanded deceleration Grdem by using a predetermined relationship. For example, the deceleration amount can be represented by a deceleration Gr, a deceleration force, or a deceleration torque. As the demanded deceleration amount, a demanded deceleration force, a demanded deceleration torque, or the like may be used as well as the demanded deceleration Grdem. In this embodiment, the deceleration Gr is used as the deceleration amount, and the demanded deceleration Grdem is used as the demanded deceleration amount. During decelerating travel of the vehicle 10, the deceleration controller 96 generates the braking torque Tb of the vehicle 10 to obtain the demanded braking torque Tbdem. The side on which the deceleration Gr is high is a side on which the braking torque Tb is small, that is, the absolute value of the braking torque Tb is large.

For example, the braking torque Tb of the vehicle 10 is generated by a regenerative braking torque Tbr, a wheel braking torque Tbw, or an engine braking torque Tbe. For example, the regenerative braking torque Tbr is a braking torque Tb obtained by braking applied through regenerative control using the second rotator MG2, that is, by regenerative braking of the second rotator MG2. In the regenerative control using the second rotator MG2, the second rotator MG2 is driven to rotate by a driven torque input from the driving wheels 14 to operate as the electric generator, and charges the battery 54 with generated electric power via the inverter 52. The wheel braking torque Tbw is a braking torque Tb obtained by the wheel brakes using the wheel braking device 86. The engine braking torque Tbe is a braking torque Tb obtained by engine braking applied by friction of the engine 12.

For example, the braking torque Tb of the vehicle 10 is generated by using the regenerative braking torque Tbr with priority from the viewpoint of improving energy efficiency. The deceleration controller 96 outputs a command to execute the regenerative control using the second rotator MG2 to the hybrid controller 94 to obtain a regenerative torque necessary for the regenerative braking torque Tbr. During rotation of the engine 12, the engine braking is applied, and therefore the engine braking torque Tbe based on the engine speed Ne is generated as the braking torque Tb of the vehicle 10. The regenerative braking torque Tbr and the engine braking torque Tbe are braking torques Tb generated by the drive sources, that is, drive source braking torques Tbp.

For example, when the absolute value of the demanded braking torque Tbdem is relatively small, the deceleration controller 96 achieves the demanded braking torque Tbdem by solely using the regenerative braking torque Tbr. For example, when the absolute value of the demanded braking torque Tbdem is relatively large, the deceleration controller 96 achieves the demanded braking torque Tbdem by adding the wheel braking torque Tbw to the regenerative braking torque Tbr. For example, immediately before the vehicle 10 is stopped, the deceleration controller 96 achieves the demanded braking torque Tbdem by replacing the regenerative braking torque Tbr with the wheel braking torque Tbw. The deceleration controller 96 outputs, to the wheel braking device 86, the brake control command signal Sbra for obtaining the wheel braking torque Tbw necessary to achieve the demanded braking torque Tbdem.

During rotation of the engine 12, the demanded braking torque Tbdem is achieved by, for example, adding the engine braking torque Tbe to the regenerative braking torque Tbr. When applying the engine braking torque Tbe, the absolute value of the engine braking torque Tbe increases as the simulated gear stage of the complex transmission 40 is on a lower vehicle speed side, for example, under the condition that the vehicle speed V is the same. When applying the engine braking torque Tbe, the deceleration controller 96 outputs a command to downshift the complex transmission 40 to the AT gear shifting controller 92 and the hybrid controller 94 based on, for example, the vehicle speed V, conditions of a traveling road such as a downward slope, and the demanded braking torque Tbdem. For example, simulated gear stages of the complex transmission 40 to be prohibited during the decelerating travel of the vehicle 10 are preset. The deceleration controller 96 outputs the command to downshift the complex transmission 40 by sequentially turning ON prohibition flags for the simulated gear stages of the complex transmission 40 from the high vehicle speed side.

The driving controller 98 can execute, as driving control on the vehicle 10, manual driving control CTm for causing the vehicle 10 to travel based on a driving operation of the driver, and the driving assistance control CTs for driving the vehicle 10 irrespective of the driving operation of the driver. In the manual driving control CTm, the vehicle 10 travels through a manual driving operation of the driver. The manual driving is a driving method in which the vehicle 10 normally travels through driving operations of the driver, such as an accelerator operation, a brake operation, and a steering operation. In the driving assistance control CTs, for example, the vehicle 10 travels through driving assistance for automatically assisting the driving operation. The driving assistance is a driving method in which the vehicle 10 travels by automatically controlling the speed or the like by the electronic control unit 90 based on, for example, information and signals from various sensors irrespective of the driving operation and intention of the driver. Examples of the automatic speed control include accelerating travel, decelerating travel, and steady travel through an accelerator operation and a braking operation.

Examples of the driving assistance control CTs include autonomous driving control in which the vehicle 10 travels through autonomous driving for automatically setting a target traveling condition based on map information and a destination input by the driver and automatically executing speed control and steering based on the target traveling condition. The driving assistance control CTs may be any driving control for driving the vehicle 10 at least by automatically controlling the speed. Examples of the driving assistance control CTs may include, in addition to the autonomous driving control, automatic vehicle speed control in which the driver carries out a part of the driving operation such as the steering operation. Examples of the automatic vehicle speed control include publicly known vehicle-to-vehicle distance control (adaptive cruise control (ACC)) serving as cruise control for controlling the driving force Tr including the braking torque Tb to cause the vehicle speed V to follow a target vehicle speed Vtgt set by the driver or keep a vehicle-to-vehicle distance from a preceding vehicle that is set by the driver. Examples of the automatic vehicle speed control also include publicly known automatic vehicle speed limiting control (adjustable speed limiter (ASL)) for controlling a driving force Fr so that the vehicle speed V does not exceed the target vehicle speed Vtgt set by the driver. That is, the driving assistance control CTs is driving control for driving the vehicle 10 at least by automatically controlling the vehicle speed V based on, for example, the vehicle periphery information Iard.

When the driving using the driving assistance is not selected because the autonomous driving selection switch or the cruise switch of the driving assistance setting switch unit 84 is turned OFF, the driving controller 98 executes the manual driving control CTm by establishing a manual driving mode. For example, the driving controller 98 executes the manual driving control CTm by outputting, to the AT gear shifting controller 92, the hybrid controller 94, and the deceleration controller 96, commands to control the stepped transmission unit 22, the engine 12, the first rotator MG1, the second rotator MG2, and the wheel braking device 86 to control the speed in response to a driver's operation.

When the autonomous driving control is selected because the driver operates the autonomous driving selection switch of the driving assistance setting switch unit 84, the driving controller 98 executes the autonomous driving control by establishing an autonomous driving mode. Specifically, the driving controller 98 automatically sets a target traveling condition based on a destination input by the driver, driver's vehicle position information obtained based on the positional information Ivp, map information obtained based on the navigation information Inavi, and various types of information on traveling roads that are obtained based on the vehicle periphery information Iard. The driving controller 98 executes the autonomous driving control by outputting, to the AT gear shifting controller 92, the hybrid controller 94, and the deceleration controller 96, commands to control the stepped transmission unit 22, the engine 12, the first rotator MG1, the second rotator MG2, and the wheel braking device 86 and outputting, to the steering device 88, the steering control command signal Sste for controlling steering of the front wheels to automatically execute speed control and steering based on the set target traveling condition.

When the adaptive cruise control (ACC) is selected because the driver operates the cruise switch of the driving assistance setting switch unit 84, the driving controller 98 executes the ACC by establishing an ACC mode. Specifically, the driving controller 98 outputs, to the AT gear shifting controller 92, the hybrid controller 94, and the deceleration controller 96, commands to control the stepped transmission unit 22, the engine 12, the first rotator MG1, the second rotator MG2, and the wheel braking device 86 to automatically control the speed based on the target vehicle speed Vtgt and the vehicle-to-vehicle distance from the preceding vehicle that are set by the driver. The hybrid controller 94 or the deceleration controller 96 sets a demanded ACC torque Taccdem that is a demanded torque in the ACC based on the target vehicle speed Vtgt and the vehicle-to-vehicle distance from the preceding vehicle that are set by the driver. The hybrid controller 94, the deceleration controller 96, and the like automatically control the speed to achieve the demanded ACC torque Taccdem. During braking in which the demanded ACC torque Taccdem has a negative value, the demanded ACC torque Taccdem serves as the demanded braking torque Tbdem.

During the travel under the driving assistance control CTs, the driver may perceive NV, a change in the engine speed Ne, or a gear shifting shock more easily than the travel under the manual driving control CTm. When the engine speed Ne is increased by downshifting the complex transmission 40 to achieve the demanded deceleration Grdem at the time of deceleration during the travel under the driving assistance control CTs, the NV may increase and drivability may decrease. When busy shifting, that is, repetition of downshift and upshift of the complex transmission 40 occurs due to an increase and a decrease in the demanded deceleration Grdem at the time of deceleration during the travel under the driving assistance control CTs, the engine speed change or the gear shifting shock may occur and the drivability may decrease.

The deceleration controller 96 executes regenerative braking using the second rotator MG2 at the time of deceleration during the travel under the driving assistance control CTs. When the demanded deceleration Grdem of the vehicle 10 is equal to or lower than a predetermined deceleration Grf that is a predetermined deceleration amount, the deceleration controller 96 restricts the downshift of the complex transmission 40. When the demanded deceleration Grdem is higher than the predetermined deceleration Grf, the deceleration controller 96 does not restrict the downshift of the complex transmission 40. In this manner, the deceleration controller 96 controls the deceleration Gr of the vehicle 10.

For example, the predetermined deceleration Grf is a predetermined maximum value of the deceleration Gr achievable by the regenerative braking using the second rotator MG2. For example, the predetermined deceleration Grf is also a predetermined maximum value of the deceleration Gr achievable when the operation position POSsh of the shift lever is a D-operation position. That is, the predetermined deceleration Grf is a deceleration Gr achievable, for example, by the demanded braking torque Tbdem when an accelerator operation amount θacc of zero is applied to the demanded drive amount map. In this embodiment, the braking torque Tb for achieving the predetermined deceleration Grf is referred to as "D-drive source braking torque TbpD". The D-operation position is a forward-travel operation position for selecting a forward-travel position (=D-position) of the complex transmission 40. The D-position of the complex transmission 40 is a shift position of the complex transmission 40 at which the vehicle 10 can travel forward by executing automatic gear shifting control on the complex transmission 40.

The electronic control unit 90 further includes status determination means, that is, a status determiner 99 to achieve a control function for suppressing the decrease in the drivability while achieving the demanded deceleration Grdem at the time of deceleration during the travel under the driving assistance control CTs.

The status determiner 99 determines whether the vehicle 10 is traveling under the driving assistance control CTs. When the status determiner 99 determines that the vehicle 10 is traveling under the driving assistance control CTs, the status determiner 99 determines whether the vehicle 10 is decelerating. For example, when the vehicle 10 is traveling under the ACC, the status determiner 99 determines whether the vehicle 10 is decelerating based on whether the demanded ACC torque Taccdem is a negative value or whether a negative value is set as the demanded ACC torque Taccdem and the demanded ACC torque Taccdem is reduced toward the set negative value.

When the status determiner 99 determines that the vehicle 10 is traveling under the driving assistance control CTs and is decelerating, the status determiner 99 determines whether the deceleration status is gentle deceleration. The status determiner 99 determines whether the deceleration status is the gentle deceleration based on whether the demanded deceleration Grdem is equal to or lower than the predetermined deceleration Grf. For example, when the vehicle 10 is traveling under the ACC, the status determiner 99 determines whether the deceleration status is the gentle deceleration based on whether the demanded ACC torque Taccdem is equal to or larger than the D-drive source braking torque TbpD. That is, the status determiner 99 determines whether the deceleration status is the gentle deceleration based on whether the absolute value of the demanded ACC torque Taccdem that is a negative value is equal to or smaller than the absolute value of the D-drive source braking torque TbpD.

When the status determiner 99 determines that the deceleration status is the gentle deceleration in the case of determination that the vehicle 10 is traveling under the driving assistance control CTs and is decelerating, the deceleration controller 96 restricts the downshift of the complex transmission 40. In particular, the deceleration controller 96 restricts the downshift of the complex transmission 40 by prohibiting the downshift of the complex transmission 40. When the deceleration status during the travel under the driving assistance control CTs is the gentle deceleration, the deceleration controller 96 achieves the demanded deceleration Grdem by using the regenerative braking torque Tbr without increasing the absolute value of the engine braking torque Tbe by downshifting the complex transmission 40.

When the status determiner 99 determines that the deceleration status is steep deceleration in the case of determination that the vehicle 10 is traveling under the driving assistance control CTs and is decelerating, the deceleration controller 96 does not restrict the downshift of the complex transmission 40. In the steep deceleration, the demanded deceleration Grdem is higher than the predetermined deceleration Grf. When the deceleration status during the travel under the driving assistance control CTs is the steep deceleration, the deceleration controller 96 achieves the demanded deceleration Grdem by using the regenerative braking torque Tbr while increasing the absolute value of the engine braking torque Tbe by downshifting the complex transmission 40 as necessary.

When the driver carries out a driving operation though the vehicle 10 is traveling under the driving assistance control CTs, the driver hardly perceives the NV, the change in the engine speed Ne, or the gear shifting shock similarly to the travel under the manual driving control CTm. Therefore, there is no need to restrict the downshift of the complex transmission 40 when a demanded deceleration Grdem along with the driver's operation is included in the demanded deceleration Grdem at the time of deceleration during the travel under the driving assistance control CTs. That is, whether to restrict the downshift of the complex transmission 40 may be determined when the demanded deceleration Grdem is only the demanded deceleration Grdem set under the driving assistance control CTs.

When the demanded deceleration Grdem along with the driver's operation is not included in the demanded deceleration Grdem during the travel under the driving assistance control CTs, the deceleration controller 96 executes switching about whether to restrict the downshift of the complex transmission 40 based on the demanded deceleration Grdem. Examples of the demanded deceleration Grdem along with the driver's operation include a demanded deceleration Grdem based on a driver's brake operation, a demanded deceleration Grdem caused by the driver who has set a lower target vehicle speed Vtgt, and a demanded deceleration Grdem caused by the driver who has set a longer vehicle-to-vehicle distance from a preceding vehicle.

When the wheel braking device 86 applies the wheel brakes during the travel under the driving assistance control CTs, a great deceleration Gr is promptly obtained as compared to the case where the absolute value of the engine braking torque Tbe is increased by downshifting the complex transmission 40. Therefore, the demanded deceleration Grdem during the travel under the driving assistance control CTs is a deceleration Gr to be achieved by the regenerative braking using the second rotator MG2 and the engine braking. When the deceleration Gr is increased by the wheel brakes in a state in which the demanded deceleration Grdem is higher than the predetermined deceleration Grf at the time of deceleration during the travel under the driving assistance control CTs, the deceleration controller 96 sets the demanded deceleration Grdem to be equal to or lower than the predetermined deceleration Grf to restrict the downshift of the complex transmission 40. For example, when the deceleration Gr is increased by the wheel brakes at the time of deceleration during the travel under the ACC, the deceleration controller 96 sets the demanded ACC torque Taccdem to be equal to or larger than the D-drive source braking torque TbpD. Examples of the case where the wheel brakes are applied during the travel under the driving assistance control CTs include a case where the wheel braking torque Tbw is needed because a preceding vehicle has applied steep braking. Examples of the case where the wheel brakes are applied during the travel under the driving assistance control CTs also include a case where the wheel braking torque Tbw is needed because another vehicle intervenes between the vehicle 10 and the preceding vehicle and therefore a new preceding vehicle is detected.

Figure 5:
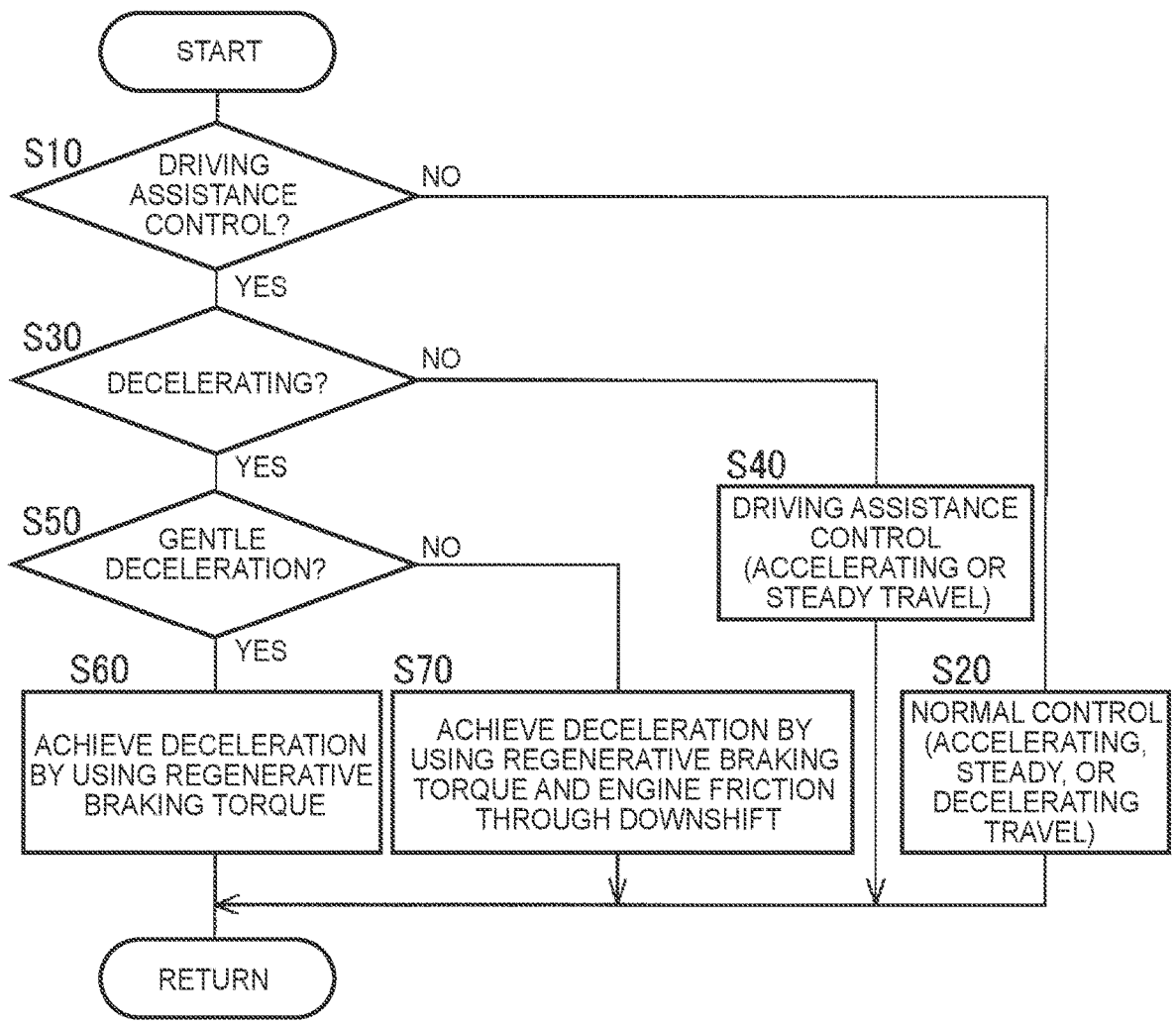
FIG. 5 is a flowchart for describing a main part of a control operation of an electronic control unit, and also describing a control operation for suppressing a decrease in drivability while achieving a demanded deceleration at the time of deceleration during travel under driving assistance control.
Figure 6:
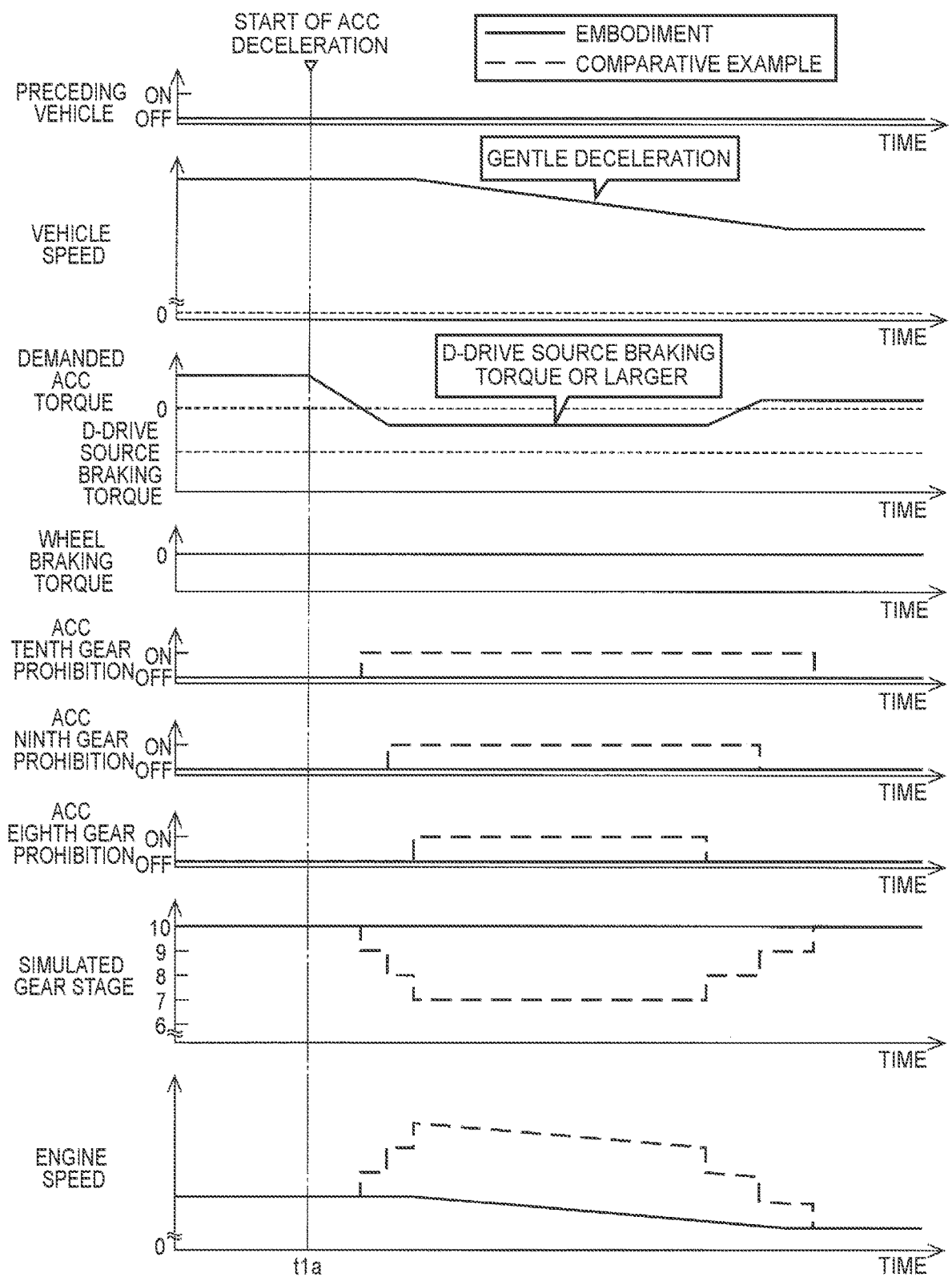
FIG. 6 is a diagram illustrating an example of a time chart in a case where the control operation illustrated in the flowchart of FIG. 5 is executed and gentle deceleration is executed.
Figure 7:
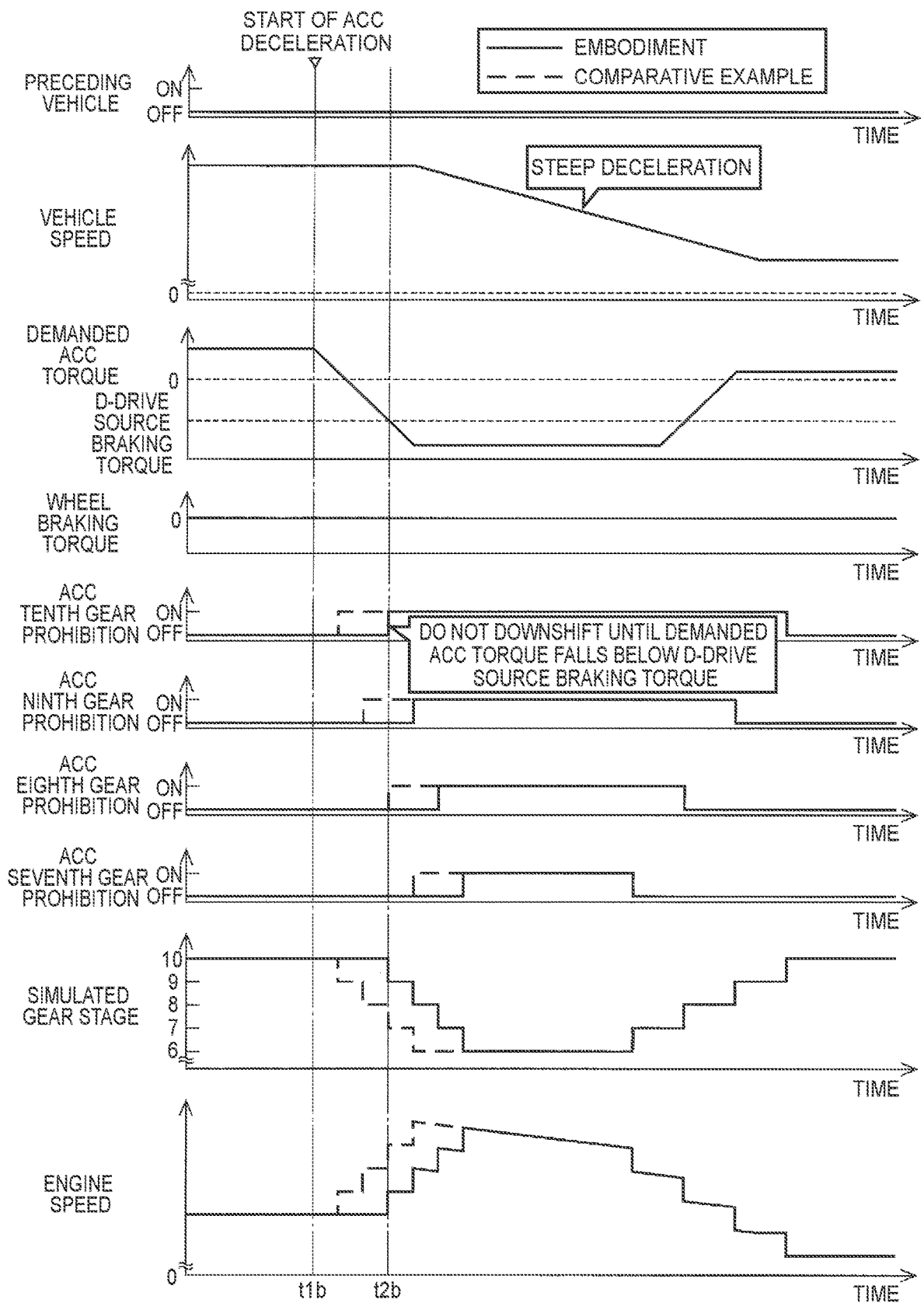
FIG. 7 is a diagram illustrating an example of a time chart in a case where the control operation illustrated in the flowchart of FIG. 5 is executed and steep deceleration is executed.
Figure 8:
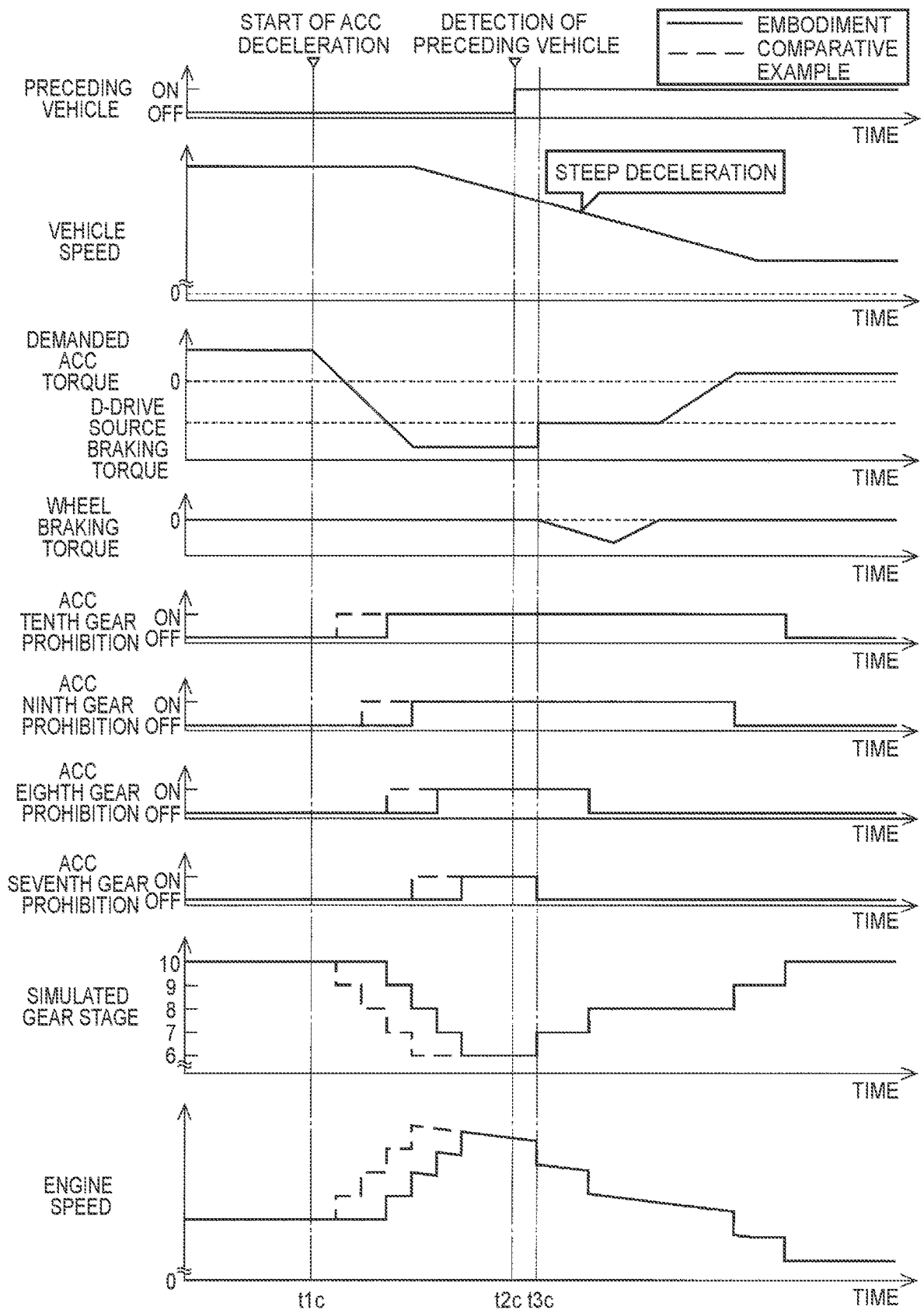
FIG. 8 is a diagram illustrating an example of a time chart in a case where the control operation illustrated in the flowchart of FIG. 5 is executed and wheel brakes are applied during the steep deceleration.

FIG. 5 is a flowchart for describing a main part of a control operation of the electronic control unit 90, and also describing a control operation for suppressing the decrease in the drivability while achieving the demanded deceleration Grdem at the time of deceleration during the travel under the driving assistance control CTs. For example, the control operation is repeatedly executed. FIG. 6, FIG. 7, and FIG. 8 are diagrams illustrating examples of a time chart in a case where the control operation illustrated in the flowchart of FIG. 5 is executed.

In Step ("Step" is omitted hereinafter) S10 corresponding to the function of the status determiner 99 in FIG. 5, determination is first made whether the vehicle 10 is traveling under the driving assistance control CTs. When the determination result is "No" in S10, accelerating travel, steady travel, or decelerating travel is executed under normal control of the manual driving control CTm in S20 corresponding to the function of, for example, the driving controller 98. When the determination result is "Yes" in S10, determination is made whether the vehicle 10 is decelerating in S30 corresponding to the function of the status determiner 99. When the determination result is "No" in S30, accelerating travel or steady travel is executed under the driving assistance control CTs in S40 corresponding to the function of, for example, the driving controller 98. When the determination result is "Yes" in S30, determination is made whether the deceleration status is the gentle deceleration in S50 corresponding to the function of the status determiner 99. When the determination result is "Yes" in S50, the downshift of the complex transmission 40 is prohibited and the demanded deceleration Grdem is achieved by using the regenerative braking torque Tbr in S60 corresponding to the function of the deceleration controller 96. In S60, the absolute value of the engine braking torque Tbe is not increased by downshifting the complex transmission 40, but the engine braking torque Tbe may be applied. When the determination result is "No" in S50, the downshift of the complex transmission 40 is not restricted and the demanded deceleration Grdem is achieved by using the regenerative braking torque Tbr while increasing the absolute value of the engine braking torque Tbe by downshifting the complex transmission 40 as necessary in S70 corresponding to the function of the deceleration controller 96.

FIG. 6 illustrates an example in which the gentle deceleration is executed during the travel under the ACC. At a time t1a in FIG. 6, the deceleration is started by reducing the demanded ACC torque Taccdem during the travel under the ACC. In a comparative example represented by dashed lines, the complex transmission 40 is downshifted by sequentially prohibiting the simulated gear stages of the complex transmission 40 from the high vehicle speed side after the start of deceleration. In the comparative example, the NV increases because the engine speed Ne increases along with the downshift of the complex transmission 40. In this embodiment represented by continuous lines, the simulated gear stages of the complex transmission 40 on the high vehicle speed side are not prohibited even after the start of deceleration because the demanded ACC torque Taccdem is equal to or larger than the D-drive source braking torque TbpD. Therefore, the complex transmission 40 is not downshifted. In this embodiment, the increase in the engine speed Ne is suppressed at the time of gentle deceleration. Thus, the increase in the NV is suppressed.

FIG. 7 illustrates an example in which the steep deceleration is executed during the travel under the ACC. At a time t1*b* in FIG. 7, the deceleration is started by reducing the demanded ACC torque Taccdem during the travel under the ACC. In a comparative example represented by dashed lines, the complex transmission 40 is downshifted by sequentially prohibiting the simulated gear stages of the complex transmission 40 from the high vehicle speed side from a timing before the demanded ACC torque Taccdem falls below the D-drive source braking torque TbpD after the start of deceleration. In this embodiment represented by continuous lines, the complex transmission 40 is downshifted by sequentially prohibiting the simulated gear stages of the complex transmission 40 from the high vehicle speed side from a timing when the demanded ACC torque Taccdem falls below the D-drive source braking torque TbpD after the start of deceleration (see a period after a time t2*b*). In this embodiment, the increase in the engine speed Ne is suppressed because the complex transmission 40 is not downshifted until the demanded ACC torque Taccdem falls below the D-drive source braking torque TbpD. In this embodiment, the absolute value of the engine braking torque Tbe is increased by downshifting the complex transmission 40 when the demanded ACC torque Taccdem falls below the D-drive source braking torque TbpD. Thus, the demanded deceleration Grdem is appropriately achieved at the time of steep deceleration. When the demanded ACC torque Taccdem increases, the prohibition of the simulated gear stages of the complex transmission 40 is sequentially terminated from the low vehicle speed side.

FIG. 8 illustrates an example in which the wheel brakes are applied when the steep deceleration is executed during the travel under the ACC. At a time t1*c* in FIG. 8, the deceleration is started by reducing the demanded ACC torque Taccdem during the travel under the ACC. In a comparative example represented by dashed lines and in this embodiment represented by continuous lines, the operation is similar to that in FIG. 7 until a preceding vehicle is detected (see a time t2*c*) and the wheel braking torque Tbw is applied. Both in the comparative example and in this embodiment, the demanded ACC torque Taccdem is set to the D-drive source braking torque TbpD (see a period after a time t3*c*) when the wheel braking torque Tbw is applied in a state in which the demanded ACC torque Taccdem is smaller than the D-drive source braking torque TbpD.

According to this embodiment described above, the regenerative braking using the second rotator MG2 is executed at the time of deceleration during the travel under the driving assistance control CTs. When the demanded deceleration Grdem is equal to or lower than the predetermined deceleration Grf, the downshift of the complex transmission 40 is restricted. When the demanded deceleration Grdem is higher than the predetermined deceleration Grf, the downshift of the complex transmission 40 is not restricted. In this manner, the deceleration Gr of the vehicle 10 is controlled. During the gentle decelerating travel, the increase in the NV along with the increase in the engine speed Ne is suppressed, and the busy shifting is suppressed. During the steep decelerating travel, a great deceleration Gr is easily obtained through the downshift. Thus, the decrease in the drivability can be suppressed while achieving the demanded deceleration Grdem at the time of deceleration during the travel under the driving assistance control CTs.

According to this embodiment, the predetermined deceleration Grf is the maximum value of the deceleration Gr achievable by the regenerative braking using the second rotator MG2. During the gentle decelerating travel, the demanded deceleration Grdem can be achieved by the regenerative braking though the downshift of the complex transmission 40 is restricted.

According to this embodiment, the downshift of the complex transmission 40 is restricted by prohibiting the downshift of the complex transmission 40. During the gentle decelerating travel, the increase in the NV along with the increase in the engine speed Ne is suppressed securely, and the busy shifting is suppressed securely.

According to this embodiment, when the demanded deceleration Grdem along with the driver's operation is not included in the demanded deceleration Grdem during the travel under the driving assistance control CTs, the switching is executed about whether to restrict the downshift of the complex transmission 40 based on the demanded deceleration Grdem. Thus, the increase in the NV and the busy shifting are easily suppressed when the driver's brake operation or any other operation for reducing the vehicle speed V is not carried out during the decelerating travel.

According to this embodiment, when the deceleration Gr is increased by the wheel brakes in the state in which the demanded deceleration Grdem to be achieved by the regenerative braking using the second rotator MG2 and the engine braking is higher than the predetermined deceleration Grf at the time of deceleration during the travel under the driving assistance control CTs, the demanded deceleration Grdem is set equal to or lower than the predetermined deceleration Grf. Thus, the downshift of the complex transmission 40 is suppressed, and a great deceleration Gr is generated by the wheel brakes with good response.

According to this embodiment, the driving assistance control CTs is the driving control for driving the vehicle 10 at least by automatically controlling the vehicle speed V based on the vehicle periphery information Iard. Thus, the demanded deceleration Grdem is appropriately achieved and the vehicle speed V is appropriately controlled at the time of deceleration during the travel under the driving assistance control CTs.

Next, another embodiment of the present disclosure is described. In the following description, parts common to the embodiments are represented by the same reference symbols to omit their description.

Second Embodiment

Figure 9:
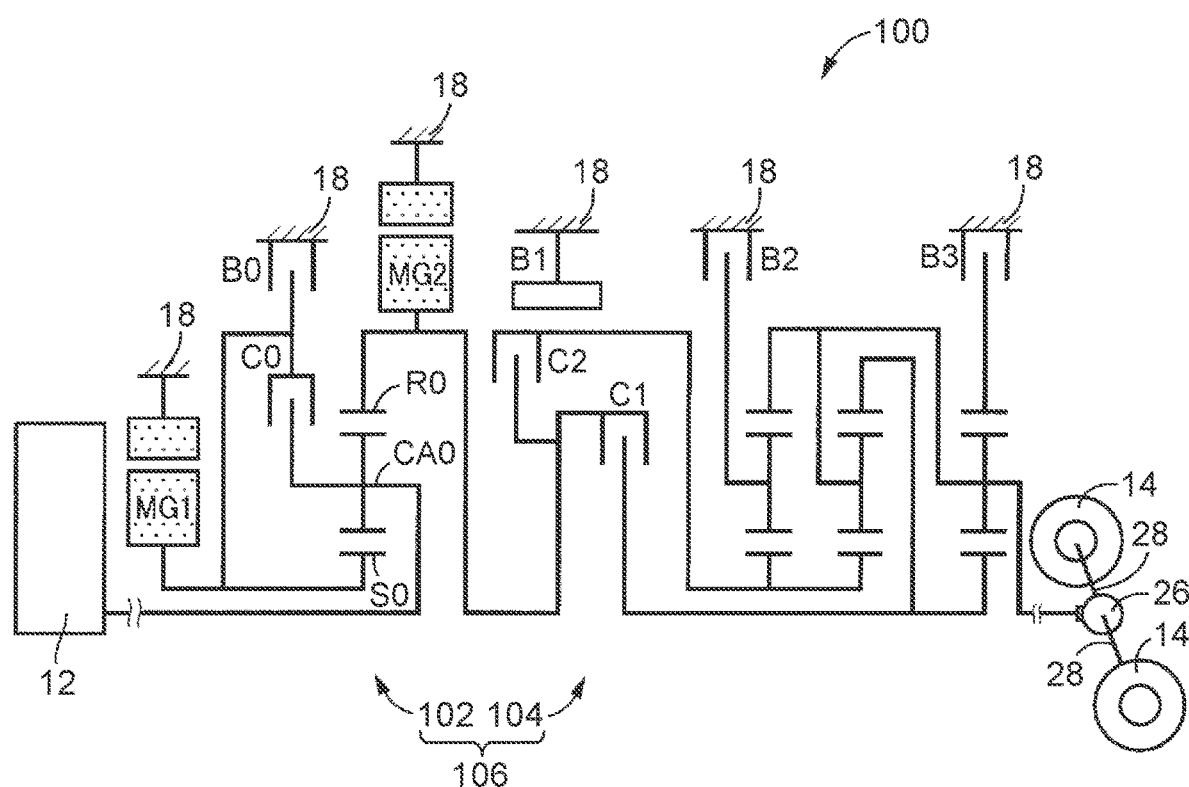
FIG. 9 is a diagram for describing a schematic structure of a vehicle to which the present disclosure is applied, and also describing an embodiment different from the embodiment relating to the vehicle of FIG. 1.

FIG. 9 is a diagram for describing the overall structure of a vehicle 100 to which the present disclosure is applied. The vehicle 100 of this embodiment differs from the vehicle 10 of the first embodiment.

In FIG. 9, an electric continuously variable transmission unit 102 of the vehicle 100 further includes a brake B0 and a clutch C0 as compared to the continuously variable transmission unit 20 of the vehicle 10. The brake B0 is provided between the sun gear S0 and the case 18. The clutch C0 is provided between the sun gear S0 and the carrier CA0.

The electric continuously variable transmission unit 102 serves as an electric continuously variable transmission similarly to the continuously variable transmission unit 20 when both the clutch C0 and the brake B0 are disengaged. The electric continuously variable transmission unit 102 is in a non-differential state in which a differential action is disabled when the clutch C0 or the brake B0 is engaged. In a non-differential state in which the clutch C0 is engaged, the electric continuously variable transmission unit 102 is in a stepped gear shifting state to function as a transmission having the gear ratio γ0 fixed to "1". In a non-differential state in which the brake B0 is engaged, the electric continuously variable transmission unit 102 is in a stepped gear shifting state to function as a speed increasing transmission having the gear ratio γ0 fixed to a value smaller than "1".

A mechanical stepped transmission unit 104 of the vehicle 100 is a publicly known planetary gearing automatic transmission including a plurality of sets of planetary gearings and a plurality of engagement devices similarly to the stepped transmission unit 22 of the vehicle 10.

A complex transmission 106 that is an overall transmission including a combination of the electric continuously variable transmission unit 102 and the mechanical stepped transmission unit 104 is an automatic transmission constituting a part of the power transmission path between the engine 12 and the driving wheels 14 similarly to the complex transmission 40 of the vehicle 10. The complex transmission 106 can operate similar to the complex transmission 40 when neither the clutch C0 nor the brake B0 is engaged. When the clutch C0 or the brake B0 is engaged, the complex transmission 106 can operate as a stepped transmission having a plurality of gear stages different in the gear ratio γt of the overall complex transmission 106.

Although the embodiments of the present disclosure are described above in detail with reference to the drawings, the present disclosure is also applied to other embodiments.

For example, in the embodiments described above, when the demanded deceleration Grdem is equal to or lower than the predetermined deceleration Grf during the travel under the driving assistance control CTs, the downshift of the complex transmission 40 is prohibited, but the engine braking torque Tbe may be applied. In the continuously variable transmission unit 20, the engine speed Ne can be kept at zero, for example, by idling the first rotator MG1 by the negative rotation in the non-load state. Thus, the engine braking can be prevented when the downshift of the complex transmission 40 is prohibited in the case where the demanded deceleration Grdem is equal to or lower than the predetermined deceleration Grf during the travel under the driving assistance control CTs. That is, the deceleration controller 96 generates the deceleration Gr through the regenerative braking using the second rotator MG2 without applying the engine braking when the demanded deceleration Grdem is equal to or lower than the predetermined deceleration Grf, and generates the deceleration Gr through the engine braking and the regenerative braking using the second rotator MG2 when the demanded deceleration Grdem is higher than the predetermined deceleration Grf. When the demanded deceleration Grdem is equal to or lower than the predetermined deceleration Grf, the deceleration Gr is generated through the regenerative braking using the second rotator MG2 without applying the engine braking. During the gentle decelerating travel, the demanded deceleration Grdem can therefore be achieved though the downshift of the complex transmission 40 is prohibited. The braking torque Tb is obtained solely through the regenerative braking using the second rotator MG2. Therefore, the energy efficiency is improved. When the demanded deceleration Grdem is higher than the predetermined deceleration Grf, the deceleration Gr is generated through the engine braking and the regenerative braking using the second rotator MG2. During the steep decelerating travel, the demanded deceleration Grdem can therefore be achieved by increasing the friction of the engine 12 through the downshift of the complex transmission 40.

In the embodiments described above, the downshift of the complex transmission 40 is restricted by prohibiting the downshift of the complex transmission 40, but the present disclosure is not limited to this case. For example, the downshift of the complex transmission 40 may be restricted such that the complex transmission 40 is downshifted once instead of twice or three times. Also in this case, predetermined effects that the increase in the NV along with the increase in the engine speed Ne is suppressed and the busy shifting is suppressed can be obtained during the gentle decelerating travel.

In the embodiments described above, the continuously variable transmission unit 20 may include a lock mechanism that can fix the carrier CA0 in a non-rotatable manner. Examples of the lock mechanism include a one-way clutch that can fix the coupling shaft 30 to the case 18. Examples of the lock mechanism also include a dog clutch, a hydraulic friction engagement device including a clutch or brake, a dry engagement device, an electromagnetic friction engagement device, and an engagement device including a magnetic-particle clutch, which can selectively couple the coupling shaft 30 to the case 18. The differential mechanism 34 may be a double-pinion planetary gearing. The differential mechanism 34 may have four or more rotational elements by coupling a plurality of planetary gearings together. The differential mechanism 34 may be a differential gear unit including a pinion to be driven to rotate by the engine 12 and a pair of bevel gears meshing with the pinion, in which the first rotator MG1 and the intermediate transmission member 32 are coupled to the bevel gears, respectively. The differential mechanism 34 may be a mechanism structured such that two or more planetary gearings are coupled together by a subset of their rotational elements and the engine, the rotators, and the driving wheels are coupled to the rotational elements of the planetary gearings to transmit driving power.

The embodiments described above are directed to the example in which the 10 types of simulated gear stage are allocated to the four types of AT gear stage, but the present disclosure is not limited to this example. The number of simulated gear stages may preferably be equal to or larger than the number of AT gear stages. The number of simulated gear stages may be equal to the number of AT gear stages, but is desirably larger than the number of AT gear stages. For example, it is appropriate that the number of simulated gear stages be twice or more as large as the number of AT gear stages. The AT gear stages are shifted so that the rotation speed of the intermediate transmission member 32 or the second rotator MG2 coupled to the intermediate transmission member 32 is kept within a predetermined rotation speed range. The simulated gear stages are shifted so that the engine speed Ne is kept within a predetermined rotation speed range. The numbers of AT gear stages and simulated gear stages are determined as appropriate.

In the embodiments described above, the vehicle 10 including the complex transmission 40 and the vehicle 100 including the complex transmission 106 are exemplified as the vehicle to which the present disclosure is applied. The vehicle is not limited to the vehicle 10 or the vehicle 100. The present disclosure is also applicable to a vehicle including a single automatic transmission. That is, the present disclosure is applicable to a vehicle including an engine, an automatic transmission constituting a part of a power transmission path between the engine and a driving wheel, and a rotator coupled to the driving wheel to transmit driving power. Examples of the automatic transmission include an automatic transmission including the continuously variable transmission unit 20 alone, an automatic transmission including the stepped transmission unit 22 alone, a publicly known synchronous meshing parallel two-shaft automatic transmission including a dual clutch transmission (DCT), and a publicly known belt-type continuously variable transmission. The rotator may be coupled to the driving wheel via the automatic transmission or without intervention of the automatic transmission to transmit driving power. The rotator may be coupled to driving wheels (for example, front wheels) to transmit driving power, and those driving wheels differ from driving wheels (for example, rear wheels) to which a driving force of the engine is transmitted. In this case, the vehicle is a four-wheel drive vehicle.

The embodiments described above are exemplary embodiments in all respects, and the present disclosure may be embodied with various modifications and revisions based on the knowledge of persons having ordinary skill in the art.

What is claimed is:

1. A control device for a vehicle including an engine, an automatic transmission constituting a part of a power transmission path between the engine and a driving wheel, and a rotator coupled to the driving wheel to transmit driving power, the control device comprising an electronic control unit configured to:
   execute driving assistance control for driving the vehicle at least by automatically controlling a speed irrespective of a driving operation of a driver;
   execute regenerative braking using the rotator at a time of deceleration during travel under the driving assistance control, and to restrict downshift of the automatic transmission when a demanded deceleration amount for the vehicle is equal to or lower than a predetermined deceleration amount; and
   execute the regenerative braking using the rotator at the time of deceleration during the travel under the driving assistance control, and not to restrict the downshift when the demanded deceleration amount is higher than the predetermined deceleration amount, wherein:
   the demanded deceleration amount is a deceleration amount to be achieved by the regenerative braking and the engine braking using friction of the engine; and
   the electronic control unit is configured to set the demanded deceleration amount to be equal to or lower than the predetermined deceleration amount when the deceleration amount is increased by a wheel brake in a state in which the demanded deceleration amount is higher than the predetermined deceleration amount at the time of deceleration during the travel under the driving assistance control.

2. The control device according to claim 1, wherein the predetermined deceleration amount is a predetermined maximum value of a deceleration amount achievable by the regenerative braking.

3. The control device according to claim 1, wherein the electronic control unit is configured to restrict the downshift by prohibiting the downshift.

4. The control device according to claim 3, wherein the electronic control unit is configured to:
   generate a deceleration amount through the regenerative braking without applying engine braking using friction of the engine when the demanded deceleration amount is equal to or lower than the predetermined deceleration amount; and
   generate the deceleration amount through the engine braking and the regenerative braking when the demanded deceleration amount is higher than the predetermined deceleration amount.

5. The control device according to claim 1, wherein the electronic control unit is configured to execute switching about whether to restrict the downshift based on the demanded deceleration amount when a second demanded deceleration amount for the vehicle along with an operation of the driver is not included in the demanded deceleration amount during the travel under the driving assistance control.

6. The control device according to claim 1, wherein the electronic control unit is configured to drive the vehicle at least by automatically controlling a vehicle speed based on information on a periphery of the vehicle.

* * * * *